US012750160B2

(12) United States Patent
Youm et al.

(10) Patent No.: US 12,750,160 B2
(45) Date of Patent: Sep. 29, 2026

(54) INTERFACE DEVICE FOR MULTIPLEXING MULTIPLE NETWORK PORTS OVER SINGLE SERDES

(71) Applicant: Marvell Asia Pte Ltd, Singapore (SG)

(72) Inventors: Dong-Seok Youm, San Jose, CA (US); Shu-Shin Chin, Santa Clara, CA (US); Lenin Kumar Patra, Dublin, CA (US); Venugopal Balasubramonian, San Jose, CA (US); Yaniv Kopelman, Mishmeret (IL); Eyal Lieder, Kiryat Bialik (IL); Joergen Peter Ravn Hofman-Bang, Ballerup (DK)

(73) Assignee: Marvell Asia Pte Ltd, Singapore (SG)

( * ) Notice: Subject to any disclaimer, the term of this patent is extended or adjusted under 35 U.S.C. 154(b) by 24 days.

(21) Appl. No.: 18/908,669

(22) Filed: Oct. 7, 2024

(65) Prior Publication Data

US 2025/0119236 A1 Apr. 10, 2025

Related U.S. Application Data

(60) Provisional application No. 63/542,750, filed on Oct. 5, 2023.

(51) Int. Cl.
*H04L 1/00* (2006.01)

(52) U.S. Cl.
CPC .......... *H04L 1/0041* (2013.01); *H04L 1/0072* (2013.01); *H04L 1/0084* (2013.01)

(58) Field of Classification Search
CPC ... H04L 1/0041; H04L 1/0072; H04L 1/0084; H04L 1/0045; H04L 1/0057; H04L 7/04; H03M 9/00; H03M 5/145

(Continued)

(56) References Cited

U.S. PATENT DOCUMENTS 7,346,819 B2 * 3/2008 Bansal ............. G01R 31/31716 714/716
9,172,661 B1 10/2015 Dropps
(Continued)

FOREIGN PATENT DOCUMENTS

WO WO-2016169133 A1 * 10/2016 ........... H04L 1/0041
WO WO-2021109702 A1 * 6/2021 ............. H04L 25/14

OTHER PUBLICATIONS

Nicholl et al, "Details of 4-lane Interleaved 100G FEC," IEEE P802.3ck Task Force, available at https://www.ieee802.org/3/ck/public/adhoc/apr24_19/nicholl_3ck_adhoc_01b_042419.pdf, Apr. 2019 (31 pages).

(Continued)

*Primary Examiner* — Esaw T Abraham
*Assistant Examiner* — Enam Ahmed

(57) ABSTRACT

An interface device distributes data from a plurality of input data streams to a smaller number first data streams, and periodically inserts a set of alignment markers (AMs) into the first data streams. After using the AMs, the interface device removes the AMs and reinserts the AMs at particular positions. A forward error correction (FEC) encoder encodes data corresponding to the first data stream to generate FEC codewords and distributes data from the FEC codewords to multiple outputs streams. Within the output streams, the AMs are located at FEC codeword boundaries and bits of a first AM, among the set of AMs, are spread across multiple outputs stream. A single output data stream is generated based on the multiple output streams of the FEC encoder.

24 Claims, 18 Drawing Sheets

(58) Field of Classification Search
USPC .......................................................... 714/726
See application file for complete search history.

(56) References Cited

U.S. PATENT DOCUMENTS

| | | | | |
|---|---|---|---|---|
| 10,749,629 | B2 | 8/2020 | Riani | |
| 2010/0313089 | A1* | 12/2010 | Rajski | G01R 31/318547 714/E11.155 |
| 2014/0223248 | A1* | 8/2014 | Koo | G06F 21/76 714/726 |
| 2019/0132185 | A1 | 5/2019 | Farhoodfar et al. | |
| 2021/0288672 | A1* | 9/2021 | Smith | H03M 13/1515 |

OTHER PUBLICATIONS

Potterf, "Ethernet MII Interfaces—Past, Present, and Proposals for Future," Cisco Systems, available at https://www.ieee802.org/3/dg/public/May_2022/potterf_3dg_01_012524. pdf, Jan. 1, 2024 (31 pages).
Potterf, "NEA MII Presentation Planning—Collaborative Development of an NEA Presentation," Cisco Systems, available at https://www.ieee802.org/3/dg/public/May_2024/Potterf_MII_NEA_Presentation_Draft_2024-07-10.pdf, Jul. 15, 2024 (57 pages).
"Enabling 100 Gigabit Ethernet Implementing PCS Lanes," Ixia, available at https://support.ixiacom.com/sites/default/files/resources/whitepaper/PCS_white_paper.pdf, Jan. 2014 (12 pages).
"Multi-link Gearbox Implementation Agreement 3.0," Optical Internetworking Forum (OIF), doc No. IA OIF-MLG-03.0, available at https://www.oiforum.com/wp-content/uploads/2019/01/OIF-MLG-03.0.pdf, Apr. 2016 (127 pages).
"QSGMII Specification," Cisco Systems, Doc. No. EDCS-540123, Rev. 1.3, available at https://community.nxp.com/pwmxy87654/attachments/pwmxy87654/powerquicc/3546/1/qsgmii%20specification.pdf, Aug. 2009 (20 pages).
"Schedule 3, 25G & 50G Specification," 25/50 Gigabit Ethernet Consortium, available at https://ethernettechnologyconsortium.org/wp-content/uploads/2020/03/25G-50G-Specification-FINAL.pdf, 2017 (32 pages).
Farhood at el., "Concatenated SFEC proposal for 200Gb/s per Lane IM-DD Optical PMD," Institute for Electrical and Electronics Engineers (IEEE) 802.3df Nov. 2022 session, available at https://www.ieee802.org/3/df/public/22_11/farhood_3df_02b_2211.pdf, Nov. 14, 2022 (19 pages).
Trowbridge, "40 GbE and 100 GbE PCS Considerations—Key Questions to be Answered Concerning OTN mapping for MLD (CTBI) Architecture," available at https://www.google.com/url?sa=t&source=web&rct=j&opi=89978449&url=https://www.ieee802.org/3/ba/public/jan08/trowbridge_01_0108.pdf&ved=2ahUKEwjU_r-3mJyMAxUIEzQIHQISB1oQFnoECBcQAQ&usg=AOvVaw0doYZmp3ILfX3Oofnjpo0o, Jan. 16, 2008, pp. 1-19.
International Search Report and Written Opinion for PCT No. PCT/US2024/050276, mailed Mar. 10, 2025 (19 pages).
Vissers, "Proposed 25G and 50G ODU25n and FlexO-1-RS-m (m=1,2) specification," Int'l Telecommunication Union, Study Group 15, Feb. 25, 2019, pp. 1-11.
Wang et al., "PCS Consideration for 50GE & NG100GbE," IEEE 802.3cd 50G&NGOATH Study Group, available at https://www.google.com/url?sa=t&source=web&rct=j&opi=89978449&url=https://www.ieee802.org/3/cd/public/July16/wang_3cd_01_0716.pdf&ved=2ahUKEwjb8q_gmpyMAxVB78kDHSaEGBUQFnoECBUQAQ&usg=AOvVaw2EX_Om6tvF4-RQx4x4FhqN, Jul. 21, 2016, pp. 1-8.

* cited by examiner

INTERFACE DEVICE FOR MULTIPLEXING MULTIPLE NETWORK PORTS OVER SINGLE SERDES

CROSS REFERENCES TO RELATED APPLICATIONS

This application claims the benefit of U.S. Provisional Patent Application No. 63/542,750, entitled "40G and 80G Universal Serial Host Interface to Support 4 or 8 Network Ports Over a Single Serdes Lane," filed on Oct. 5, 2023, which is incorporated herein by reference in its entirety for all purposes.

FIELD OF TECHNOLOGY

The present disclosure relates generally to network communications, and more particularly to aggregating data received from multiple ports for transmitting via a single higher speed link.

BACKGROUND

USXGMII-M is an architecture for multiplexing data from multiple network ports to a single physical layer-media access control layer (PHY-MAC) interface, and vice versa. In a common use case, the multiple network ports typically correspond to copper cables such as CAT5 or CAT5E cables, whereas the single PHY-MAC interface corresponds to an optical cable. For example, USXGMII-M describes an architecture for multiplexing data from four 2.578125 gigabits per second (Gbps) ports to a single PHY-MAC interface having a 10.3125 Gbps serializer-deserializer (SERDES). USXGMII-M also describes an architecture for multiplexing data from eight 2.578125 Gbps ports to a single PHY-MAC interface having a 20.625 Gbps SERDES.

Another architecture, commonly referred to as MP-USXGMII, multiplexes data from four 10.3125 Gbps ports to two PHY-MAC interfaces, each having a 20.625 Gbps SERDES; or multiplexes data from eight 10.3125 Gbps ports to four PHY-MAC interfaces, each having a 20.625 Gbps SERDES.

SUMMARY

In an embodiment, an interface device converts a plurality of input data streams into a single output data stream. The interface device comprises: first circuitry configured to receive a plurality of input data streams and to distribute bit blocks from the plurality of input data streams to a number of first data streams that is less than a number of input data streams in the plurality of input data streams; second circuitry configured to periodically insert a set of alignment markers (AMs) into the first data streams in between bit blocks, the set of AMs comprising at most the number of input data streams; third circuitry configured to lock to the AMs in the first data streams; fourth circuitry configured to, after locking to the AMs: remove the AMs, and reinsert the AMs so that after being processed by forward error correction (FEC) encoding circuitry, the AMs are located at an FEC codeword boundary and bits of a first AM, among the set of AMs, are spread across multiple outputs streams of the FEC encoding circuitry; the FEC encoding circuitry, the FEC encoding circuitry configured to i) encode data output by the fourth circuitry according to an FEC code to generate FEC codewords, and ii) distribute data from the FEC codewords to the multiple outputs streams of the FEC encoding circuitry; and fifth circuitry configured to generate the single output data stream based on the multiple output streams of the FEC encoding circuitry.

In another embodiment, a method is for converting a plurality of input data streams into a single output data stream. The method includes: distributing, by first circuitry of an interface device, bit blocks from a plurality of input data streams to a number of first data streams that is less than a number of input data streams in the plurality of input data streams; periodically inserting, by second circuitry, a set of alignment markers (AMs) into the first data streams in between bit blocks, the set of AMs comprising at most the number of input data streams; locking, by third circuitry, to AMs in the first data streams; after locking to the AMs: removing, by fourth circuitry, the AMs, and reinserting, by the fourth circuitry, the AMs so that after being processed by forward error correction (FEC) encoding circuitry, the AMs are located at an FEC codeword boundary and bits of a first AM, among the set of AMs, are spread across multiple outputs streams of the FEC encoding circuitry; encoding, by the FEC encoding circuitry, data output by the fourth circuitry according to an FEC to generate FEC codewords; distributing, by the FEC encoding circuitry, data from the FEC codewords to the multiple outputs streams of the FEC encoding circuitry; and generating, by fifth circuitry, the single output data stream based on the multiple output streams of the FEC encoding circuitry.

In still another embodiment, an interface device converts a plurality of input data streams into a single output data stream. The interface device comprises: first circuitry configured to: write data from a plurality of input streams to respective FIFO buffers at a first rate, read data from the FIFO buffers at a second rate higher than the first rate to generate respective first data streams, periodically insert dummy bit blocks and alignment markers (AMs) into the first data streams, and distribute data from the first data streams to a plurality of second data streams, wherein a number second data streams is less than a number of first data streams; second circuitry configured to lock to the AMs in the second data streams and provide data in the second streams to forward error correction (FEC) encoder circuitry; the FEC encoder circuitry, the FEC encoding circuitry configured to encode data from the second circuitry according to an FEC code to generate FEC codewords; and third circuitry configured to generate the single output data stream based on the FEC codewords generated by the FEC encoding circuitry.

In yet another embodiment, a method is for converting a plurality of input data streams into a single output data stream. The method includes: writing data from a plurality of input streams to respective first-in-first-out (FIFO) buffers at a first rate; reading data from the FIFO buffers at a second rate higher than the first rate to generate respective first data streams; periodically inserting, by first circuitry, dummy bit blocks and alignment markers (AMs) into the first data streams; distributing, by the first circuitry, data from the first data streams to a plurality of second data streams, wherein a number second data streams is less than a number of first data streams; locking, by second circuitry, to the AMs in the second data streams; providing, by the second circuitry, data in the second streams to forward error correction (FEC) encoder circuitry; encoding, by the FEC encoder circuitry, data from the second circuitry according to an FEC code to generate FEC codewords; and generating, by third circuitry, the single output data stream based on the FEC codewords generated by the FEC encoding circuitry.

DETAILED DESCRIPTION

As discussed above, current architectures multiplex data from four or eight 10.3125 Gbps ports to multiple 20.625 gigabits per second (Gbps) serializer-deserializer (SERDES) (e.g., two SERDES or four SERDES, respectively). In embodiments described below, an interface device multiplexes data from multiple (e.g., four, eight, etc.) 10.3125 Gbps (sometimes referred to as “10 G”) input data streams to a single SERDES (e.g., an 82.5 Gbps (sometimes referred to as “80 G”) SERDES, a 103.125 Gbps (sometimes referred to as “100 G”) SERDES, etc. Transmitting data from multiple 10 G data streams via single SERDES uses less integrated circuit chip area, less external integrated circuit (IC) chip external connects (e.g., pins), and/or less power as compared to architectures that employ multiple SERDES. Multiple embodiments of techniques that enable the multiplexing of data from multiple streams to a single, higher speed stream are described below.

As will be described in more detail below, the interface device periodically inserts alignment markers (AMs) into the data from the multiple 10 G input streams to help maintain alignment of data from the multiple 10 G streams during processing by the interface device. Additionally, the AMs provide a mechanism for a receiver of the output of the SERDES to demultiplex the multiple 10 G streams from the output of the SERDES. An amount of AMs added to the data from the 10 G data streams is selected so that the AMs can be added by replacing idle data from interpacket gaps (IPGs) between packets, in some embodiments. In other embodiments in which the single data stream has a bit rate greater than a cumulative bit rate of the 10 G input streams, at least some AMs added to the data from the 10 G data streams do not replace idle data from IPGs between packets. Instead, Additionally, the interface device removes the AMs after the interface device is done using the AMs and reinserts the AMs so that the AMs are aligned with forward error correction (FEC) codeword boundaries to allow a receiver device to use the AMs to identify FEC codeword boundaries and to properly demultiplex the single stream into the multiple 10 G data streams.

Figure 1A:
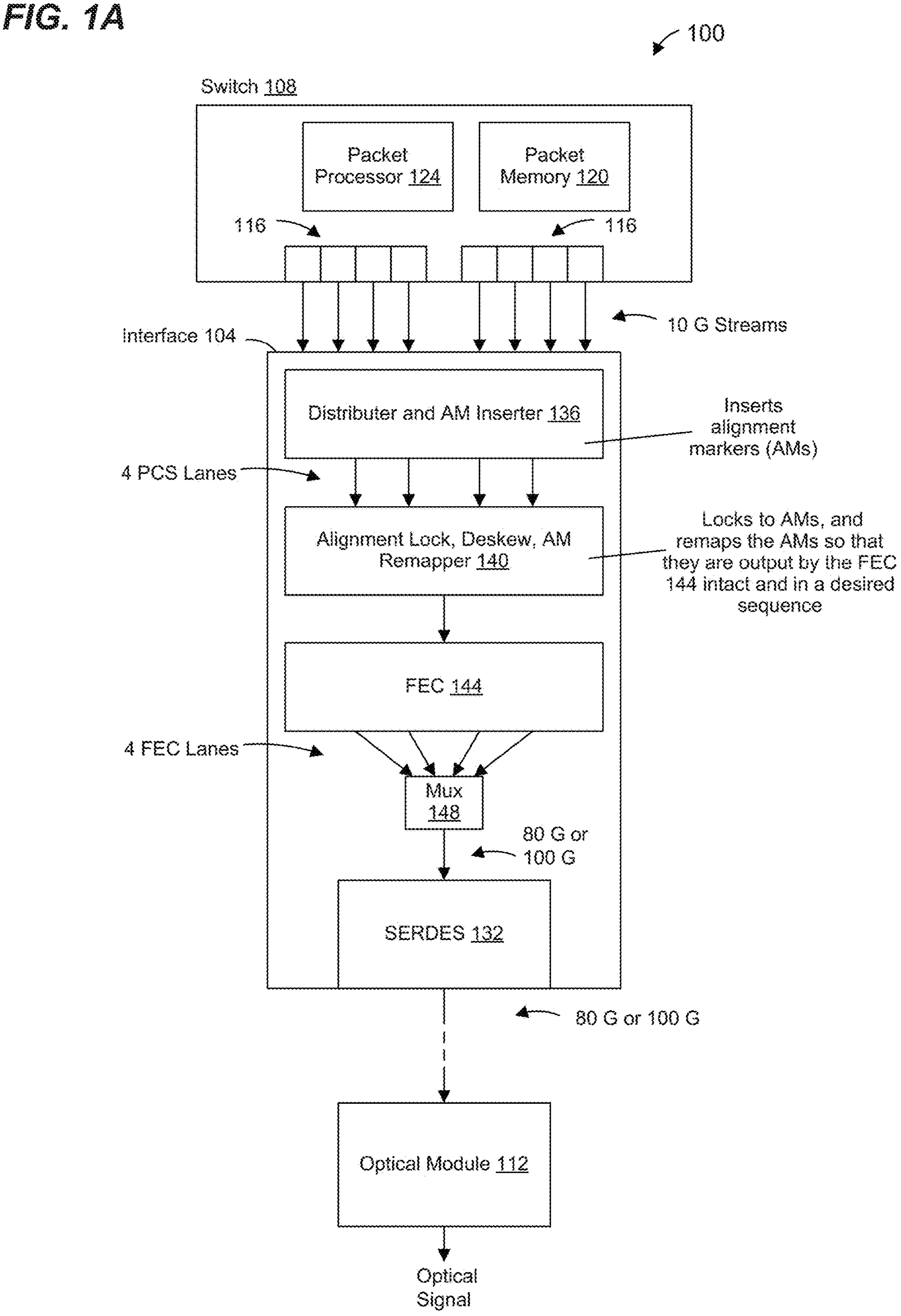
FIG. 1A is a simplified diagram of an example system having an example interface device that multiplexes data from eight 10.3125 gigabits per second (Gbps) input data streams to a single SERDES, according to an embodiment.

FIG. 1A is a simplified diagram of an example system 100 having an example interface device 104 that multiplexes data from multiple (e.g., four, eight, etc.) 10 G input data streams to a single stream, according to an embodiment. The interface device 104 interfaces a network switch 108 with an optical module 112.

The network switch 108 includes a plurality of network interfaces 116 that are configured to communicatively couple with a plurality of network links, as will be described further below. In an embodiment, each of at least some of the network interfaces 116 is configured to communicate at data rates of up to 10 G. In other embodiments, each of at least some of the network interfaces 116 is configured to communicate at other suitable data rates. Although eight network interfaces 116 coupled to the interface device 104 are illustrated in FIG. 1A, the network switch 108 includes additional network interfaces 116 (not shown) coupled to one or more other interface devices (not shown) distinct from the interface device 104, in an embodiment. Also, although eight network interfaces 116 are illustrated in FIG. 1A as being coupled to the interface device 104, other suitable numbers of network interfaces 116 coupled to the interface device 104, such a two, four, etc., in other embodiments.

The network switch 108 includes a memory 120 to store packet data corresponding to packets received via the network interfaces 116, and a packet processor 124 to analyze at least packet header data of packets received via the network interfaces 116 to determine network interfaces 116 via which the packet are to be forwarded, etc.

In an embodiment, each of at least some of the network interfaces 116 is configured to output a respective 10 G data stream, at least in some scenarios. In an embodiment, each of at least some of the network interfaces 116 is configured to output a respective data stream at different data rates, including at 10 G, 5 Gbps (5 G), 2.5 G, 1 Gbps (1 G), 100 megabits per second (Mbps) (100 M), and 10 Mbps (10 M), depending on a scenario in which the network switch 108 is operating.

As will be described further below, the interface device 104 is configured to multiplex the multiple up to 10 G data streams from the network switch 108 into a single 80 G data stream, or into a single 100 G data stream. The single data stream is output by the interface device 104 via a serializer-deserializer device (SERDES) 132. The SERDES 132 generates a serial data stream that is suitable for conveying the single data stream over a physical distance between the interface device 104 and the optical module 112.

The interface device 104 includes a distribution and AM insertion circuit 136 (the "distribution circuit 136") that is configured to distribute data from the 10 G streams received from the switch device 108 to fewer internal lanes (e.g., four internal lanes), sometimes referred to herein as physical coding sublayer (PCS) lanes, the PCS lanes carrying internal data streams. Additionally, the distribution circuit 136 inserts AMs into the data from the 10 G streams received from the switch device 108 to help maintain alignment of data from the eight 10 G streams during subsequent processing by the interface device 104. An amount of AMs added to the data from the 10 G streams is selected so that the AMs can be added by replacing idle data from IPGs between packets, in an embodiment. In other embodiments in which the single data stream has a bit rate (e.g., 100 G) greater than a cumulative bit rate of the 10 G input streams, at least some AMs added to the data from the 10 G data streams do not replace idle data from IPGs between packets because the high data rate (e.g., 100 G) already provides headroom to insert AMs without having to delete idle data.

An alignment lock circuit 140 is coupled between the PCS lanes and a forward error correction (FEC) circuit 144. The alignment lock circuit 140 is configured to achieve AM lock using the AMs added by the AM insertion circuit 136, multiplex data from the PCS lanes into a single data stream, and remove the AMs. Additionally, the AM lock circuit 140 is configured to re-insert the AMs into the single data stream so that, after the interface device 104 multiplexes the data into a single output stream, the AMs are in aligned with forward error correction (FEC) codeword boundaries within the single stream to allow a receiver device to use the AMs to identify FEC codeword boundaries and to properly demultiplex the single stream into the multiple, up to 10 G data streams. For example, because AMs are re-inserted at FEC codeword boundaries, the receiver device can use the AMs to identify the FEC codeword boundaries.

The FEC circuit 144 is configured to encode, according to an FEC code, data received from the alignment lock circuit 140 to generate encoded data, and to distribute the encoded data among FEC output lanes. A multiplexer 148 multiplexes the outputs of the FEC circuit 144 into a single data stream. Because of the remapping of the AMs by the alignment lock circuit 140, as discussed above, the AMs are in proper position within the single stream output by the multiplexer 148 to allow a receiver device to use the AMs to properly demultiplex the single stream into the eight 10 G data streams.

The optical module 112 generates an optical signal using the output of the SERDES 132, the optical signal for transmission via a suitable communication medium such as a fiber optic cable, a waveguide, free space, etc. The optical module 112 includes driver circuitry (not shown) and an optical modulator (not shown), the driver circuitry configured to generate a drive signal, based on the output from the SERDES 132, suitable for driving an optical modulator (not shown).

Figure 1B:
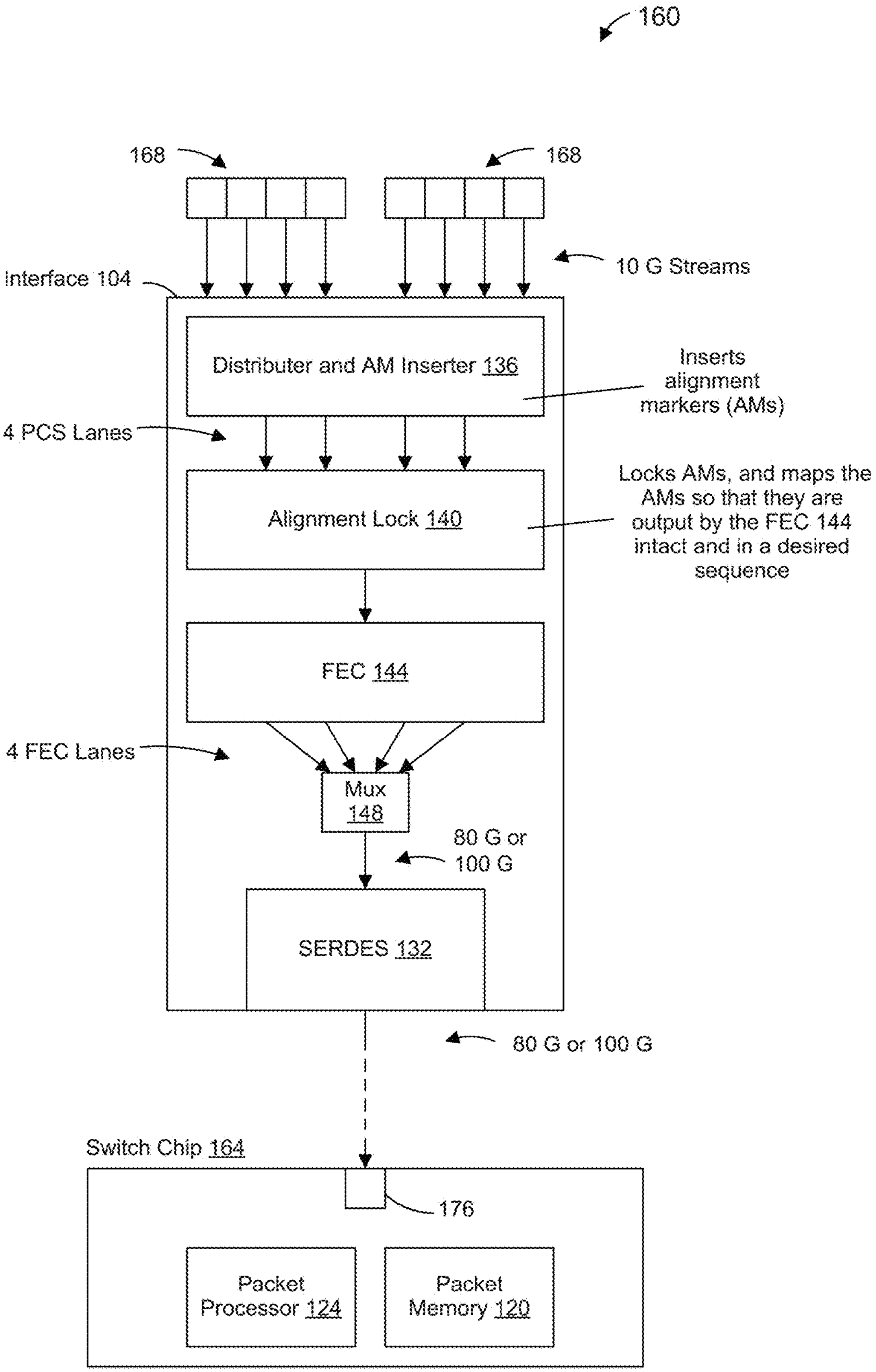
FIG. 1B is a simplified diagram of another example system having an example interface device that multiplexes data from eight 10.3125 Gbps input data streams to a single SERDES, according to another embodiment.

FIG. 1B is a simplified diagram of another example system 160 in which the example interface device 104 multiplexes data from eight 10 G input data streams to a single SERDES, according to another embodiment. The interface device 104 interfaces a network switch integrated circuit (IC) chip 164 ("switch chip 164") with a plurality of network ports 168. The switch chip 164 has a structure similar the network switch 104 of FIG. 1A, and like-numbered elements are not described again in detail for purposes of brevity.

The network switch 108 includes a plurality of network interfaces 176 that are configured to communicatively couple with a plurality of network links, as will be described further below. In an embodiment, each of at least some of the network interfaces 176 is configured to communicate at data rates of up to 80 G. In another embodiment, each of at least some of the network interfaces 176 is configured to communicate at data rates of up to 100 G. In other embodiments, each of at least some of the network interfaces 176 is configured to communicate at other suitable data rates. Although one network interface 176 coupled to the interface device 104 is illustrated in FIG. 1B, the switch chip 164 includes additional network interfaces 176 (not shown) coupled to one or more other interface devices (not shown) distinct from the interface device 104, in an embodiment.

The switch chip 164 is included within in a suitable chip package having suitable external interconnect structures for inputting and outputting signals to/from the switch chip 164, such as a ball grid array (BGA), a pin grid array (PGA), etc.

The network ports 168 are optical ports, in an embodiment. In other embodiments, the network ports 168 are electrical ports.

The ports 168 are configured to communicatively couple with a plurality of network links. In an embodiment, each of at least some of the ports 168 is configured to communicate at data rates of up to 10 G. In other embodiments, each of at least some of the ports 168 is configured to communicate at other suitable data rates. Although eight ports 168 coupled to the interface device 104 are illustrated in FIG. 1B, the system 160 includes additional ports 168 coupled to one or more other interface devices (not shown) distinct from the interface device 104, in an embodiment.

In an embodiment, each of at least some of the ports 168 is configured to output a respective 10 G data stream, at least in some scenarios. In an embodiment, each of at least some of the ports 168 is configured to output a respective data stream at different data rates, including at 10 G, 5 Gbps (5 G), 2.5 G, 1 Gbps (1 G), 100 megabits per second (Mbps) (100 M), and 10 Mbps (10 M), depending on a scenario in which the system 160 is operating. In an embodiment, each port 168 is configured to handle data according to two or more of: i) 10GBASE-T, ii) 5GBASE-T, iii) 2.5GBASE-T, iv) 1GBASE-T, v) 100BASE-T, vi) 10BASE-T, etc. In other embodiments, each port 168 is configured to handle data according to one or more other suitable types of cables and/or data rates.

Similar to the system 100 of FIG. 1A, the interface device 104 is configured to multiplex the eight 10 G data streams from the ports 168 into a single 80 G data stream, or into a single 100 G data stream. The SERDES 132 generates a serial data stream that is suitable for conveying the single data stream over a physical distance between the interface device 104 and the switch chip 164.

By multiplexing multiple data streams into a single, higher data rate stream, a number of external connections (e.g., pins, balls, etc.) of the switch chip 164 can be reduced, at least in some embodiments. For instance, with many IC fabrication and/or chip packaging technologies, it is difficult to produce, in a commercially viable manner, a chip package having a switch IC large numbers of high speed external connections. By multiplexing multiple data streams into a single, higher data rate stream with the interface device 104, the number of external connections required on the switch chip 164 can be reduced, according to some embodiments.

Figure 2:
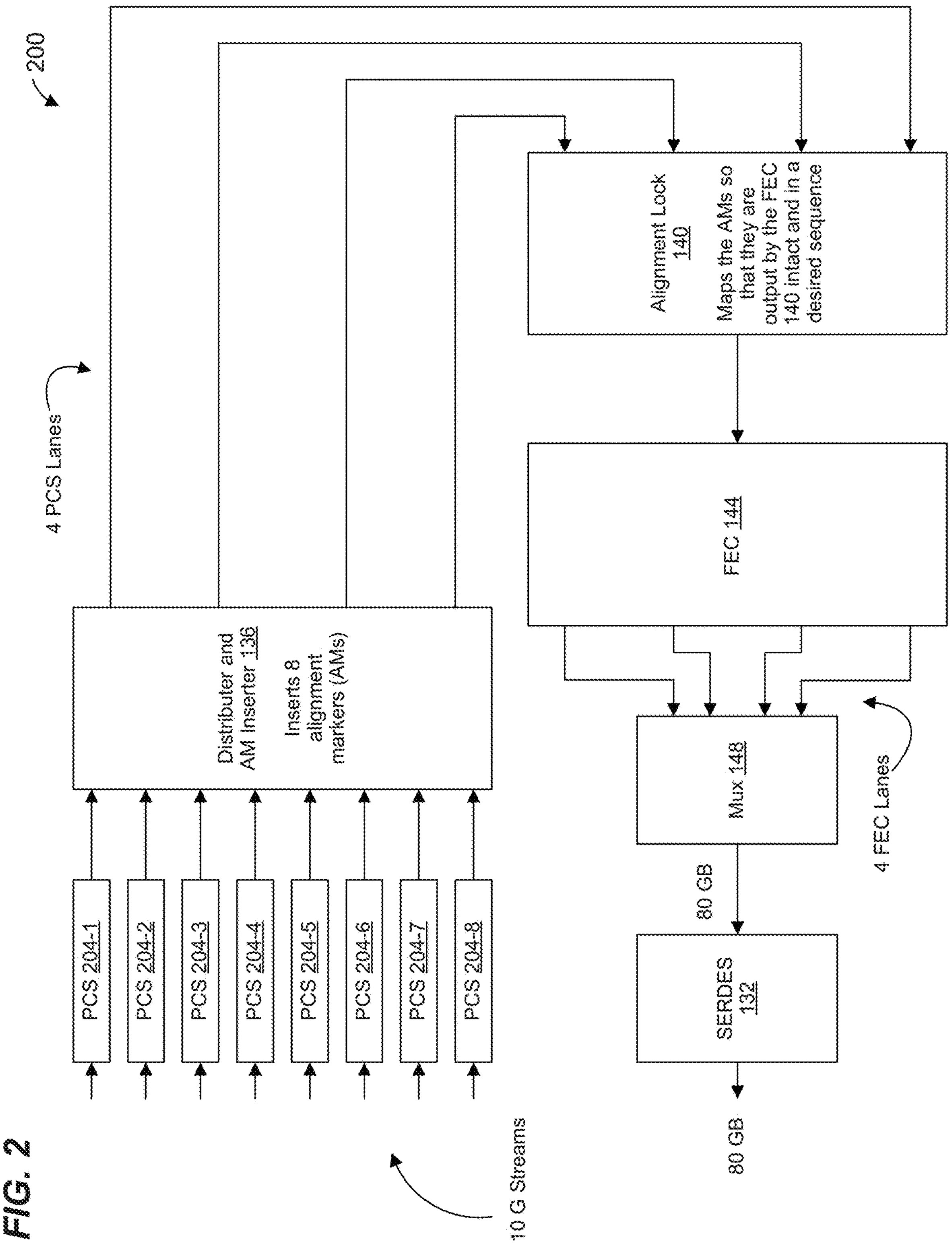
FIG. 2 is a simplified diagram of an example interface device that is used in the system of FIG. 1A and/or the system of FIG. 1B, according to an embodiment.

FIG. 2 is a simplified diagram of an example interface device 200 that is used in the system 100 and/or in the system 160 as the interface device 104, according to some embodiments. In other embodiments, the interface device 200 is used in another suitable system different than the system 100 of FIG. 1A and the system 160 of FIG. 1B. In other embodiments, the system 100 and/or the system 160 includes another suitable interface device different than the interface device 200.

The interface device 200 is configured to multiplex 8 10G data streams into a single 80 G data stream, according to an embodiment.

The interface device 200 includes a plurality of PCS circuits 204 configured to receive data streams from another device and/or set of port, such as the switch 108 (FIG. 1A), or the ports 168 (FIG. 1B). Each PCS circuit 204 is configured to receive a corresponding data stream that includes 64-bit blocks and to encode each of at least some of the 64-bit blocks into a 66-bit block.

Figure 3:
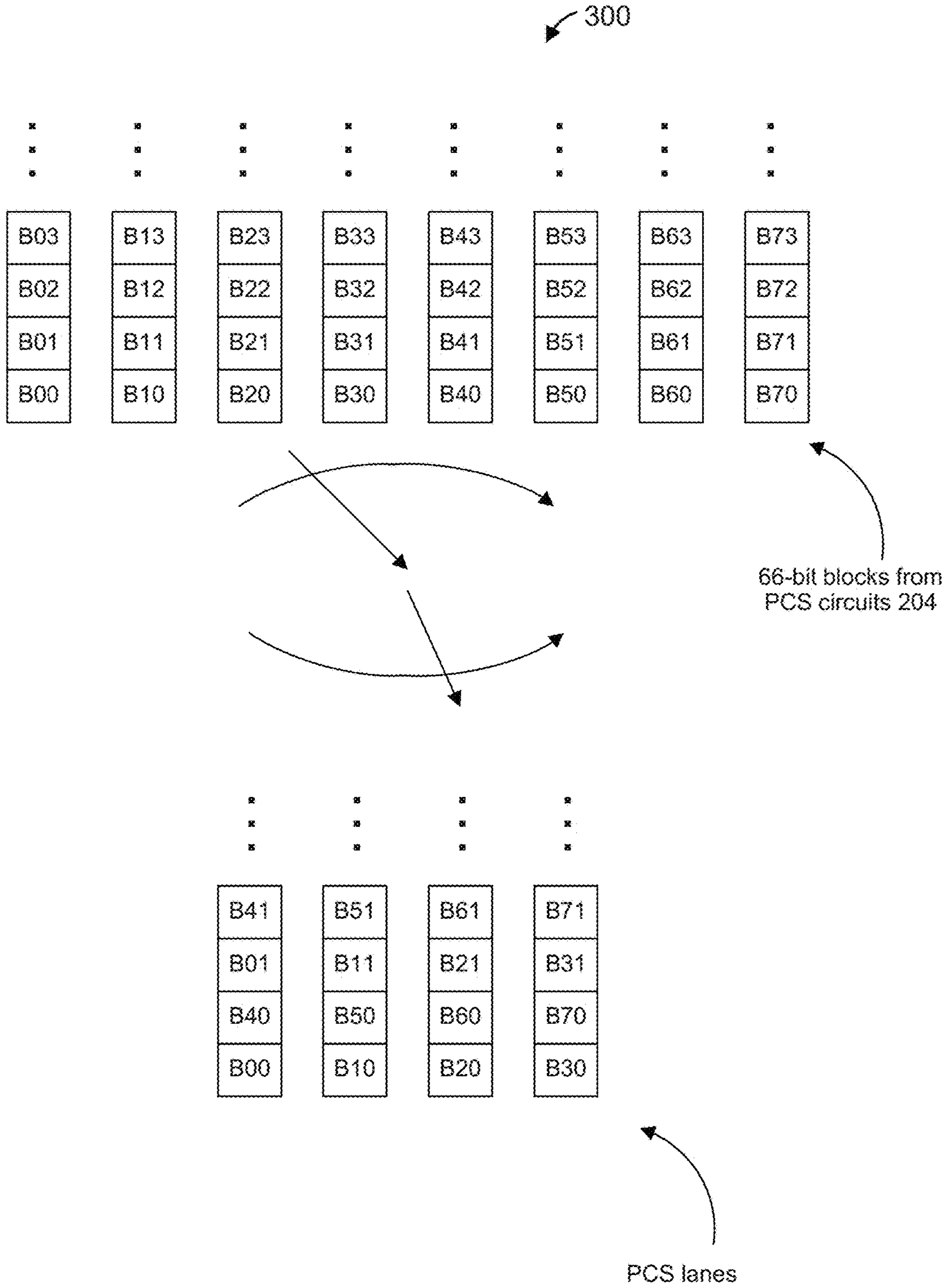
FIG. 3 is a diagram that illustrates an example distribution of bit blocks to physical coding sublayer (PCS) lanes performed by the interface device of FIG. 2, according to an embodiment.

The distribution circuit 136 receives 66-bit blocks output by the PCS circuits 204 and distributes the 66-bit blocks to four PCS lanes. FIG. 3 is a diagram that illustrates an example distribution of 66-bit blocks output by the PCS circuits 204 to the four PCS lanes performed by the distribution circuit 136, according to an embodiment. In the example of FIG. 3, 66-bit blocks are selected from amongst the PCS circuits 204 in a round-robin manner, and selected 66-bit blocks distributed to the PCS lanes in round-robin manner. In other embodiments, the 66-bit blocks are distributed from amongst the PCS circuits 204 to the PCS lanes in another suitable manner.

Figure 4:
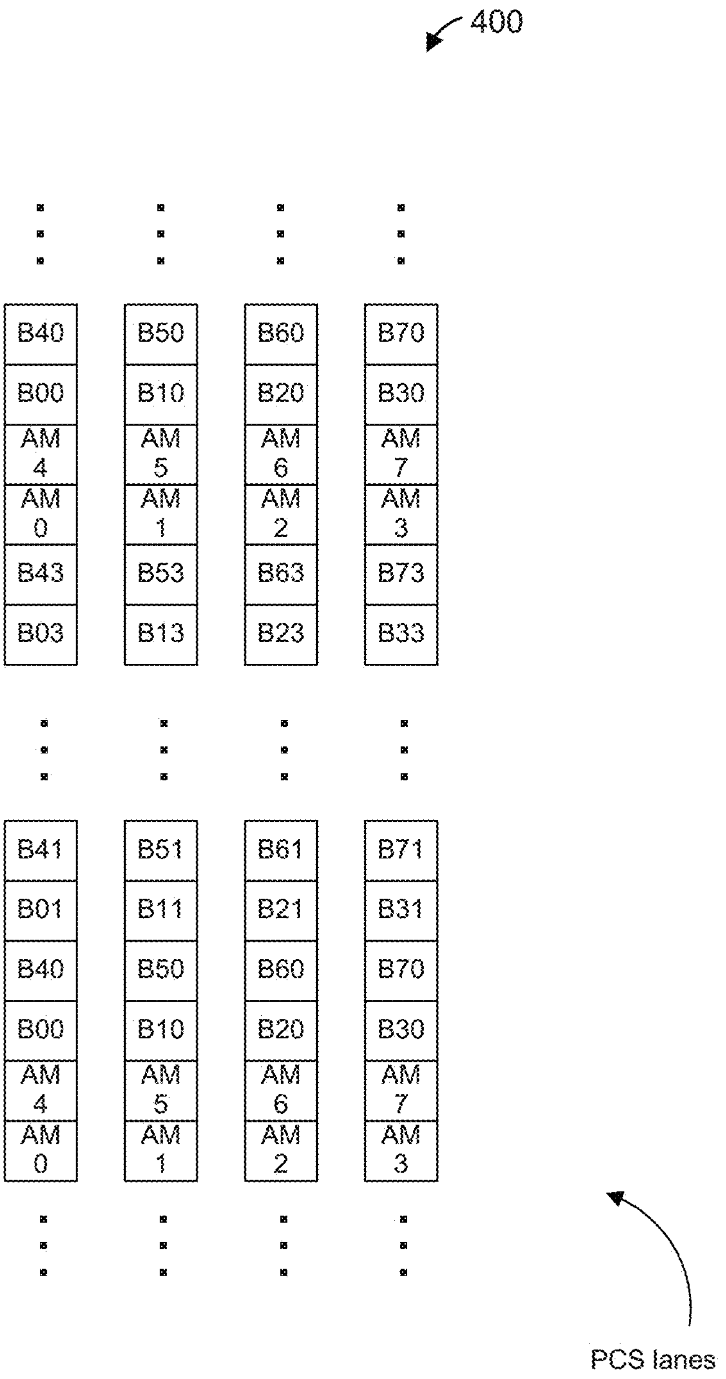
FIG. 4 is a diagram that illustrates an example of periodically inserting alignment markers (AMs) in four PCS lanes performed by the interface device of FIG. 2, according to an embodiment.

Referring again to FIG. 2, the distribution circuit 136 periodically inserts AMs into the PCS streams as generally discussed above. FIG. 4 is a diagram that illustrates an example of the distribution circuit 136 periodically inserting AMs in four PCS lanes, according to an embodiment. Each AM consists of 66 bits (i.e., 8 bytes plus 2 bits) and includes a control block sync header, in an embodiment. In an embodiment, the distribution circuit 136 inserts a block of AMs into all of the PCS lanes in parallel.

To make room in the streams of 66-bit blocks for the AMs, idle characters corresponding to IPGs are periodically removed from the streams, in an embodiment. The IEEE 802.3 Standard specifies that IPGs have an average duration of 12 bytes. Therefore, there are sufficient bytes in an IPG eligible to make room for an AM of approximately 8 bytes.

Figure 5:
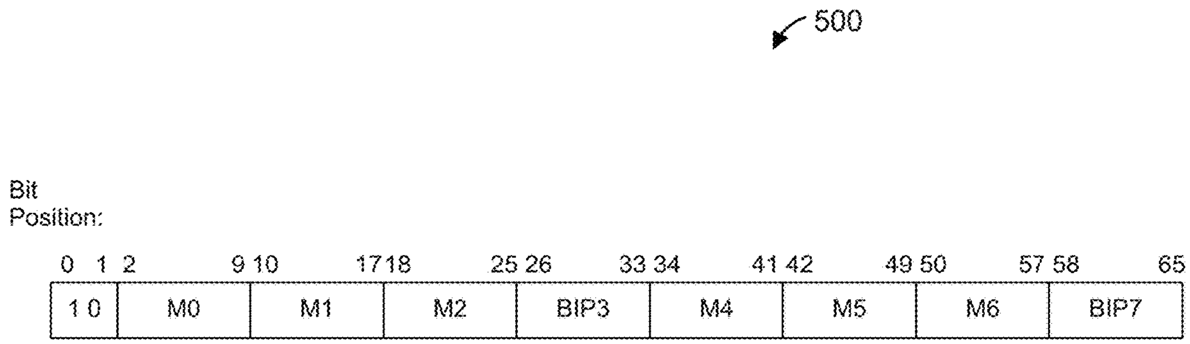
FIG. 5 is simplified diagram of an example alignment marker used by the interface devices of FIGS. 1A-B and 2, according to an embodiment.

FIG. 5 is simplified diagram of an example AM 500, according to an embodiment. The AM 500 includes respective bytes M0, M1, M2, M4, M5, and M6, and respective bit interleaved parity (BIP) fields BIP3 and BIP7. The bytes M0, M1, M2, M4, M5, and M6 are unique for each of the up to 10 G input streams. Bytes M4 through M6 are bit-wise inversions of M0 through M2, respectively. The BIP3 field contains the result of a bit interleaved parity calculation. For example, each bit in the BIP3 field is an even parity calculation over all previous specified bits of a respective up to 10 G input stream, from and including the previous AM, but not including the current AM. The BIP7 field is a bitwise inversion of the BIP3 field. Bytes M4 through M6 being bit-wise inversions of M0 through M2, and the BIP7 field being a bitwise inversion of the BIP3 field keeps the AM DC-balanced, in an embodiment.

Referring again to FIG. 2, the alignment lock circuit 140 is configured to achieve lock (i.e., synchronize) to the 66-bit blocks in each PCS lane, and achieve lock (i.e., synchronize) to the AMs.

After achieving lock to the 66-bit blocks and to the AMs, the alignment lock circuit 140 is configured to multiplex data from the PCS lanes into a single FEC input stream and remove the AMs.

Further, the alignment lock circuit 140 is configured to perform a transcoding process to transcode sets of four 66-bit blocks in the FEC input stream into 257-bit blocks.

In an embodiment, the alignment lock circuit 140 is configured to map information in the AMs that were removed to new AMs, and to insert the new AMs into the FEC input stream. As a result of the mapping to new AMs and insertion of the new AMs, after the interface device 104 multiplexes the data into a single output stream, the AMs are aligned to FEC codeword boundaries within the single stream to allow a receiver device to use the AMs to identify FEC codeword boundaries and to properly demultiplex the single stream into the eight up to 10 G data streams. More specifically, the alignment marker mapping/insertion function compensates for operation of a symbol distribution function to be performed after FEC encoding (as is discussed further below) and rearranges the AM bits so that the AMs appear on the FEC output lanes intact and in a desired sequence, which preserves properties of the alignment markers (e.g., DC balance and transition density) and provides a deterministic pattern for the purpose of synchronization. A device that receives the data uses knowledge of the AM mapping to identify FEC codeword boundaries, in an embodiment.

As part of the alignment marker mapping, the AMs that were removed (am_tx_x<65:0> is an alignment marker for a 10 G lane x, x=0 to 7, where bit 0 is the first bit transmitted) are mapped to a 514-bit value am_txmapped<513:0> in a manner that yields the same result as the following process:

For x=0 to 7, amp_tx_x<63:0>:

- Set y=0 when x≤3, otherwise set y=x.
- amp_tx_x<23:0> is set to the values specified for M0, M1, and M2
- amp_tx_x<31:24>=am_tx_x<33:26>
- amp_tx_x<55:32> is set to the values specified for M4, M5, and M6
- amp_tx_x<63:56>=am_tx_x<65:58>

This process replaces the fixed bytes of the alignment markers received via the PCS lanes, possibly with errors, with the specified values M0, M1, M2, M4, M5, and M6. In addition, the fixed bytes of the AMs corresponding to 10 G lanes 1, 2, and 3 are replaced with the fixed bytes for the alignment marker corresponding to 10 G lane 0. The variable bytes of BIP3 and BIP7 are unchanged. This process simplifies receiver synchronization since the receiver only needs to search for the fixed bytes corresponding to 10 G lane 0.

The payloads am_txpayloads<0,129:0>, am_txpayloads<1,129:0>, am_txpayloads<2,129:0> and am_txpayloads<3,123:0> are then constructed from amp_tx_x as follows:

am_txpayloads<0, 63:0>=amp_tx_0<63:0>
am_txpayloads<0, 127:64>=amp_tx_4<63:0>
am_txpayloads<0, 129:128>=amp_tx_7<57:56>
am_txpayloads<1, 63:0>=amp_tx_1<63:0>
am_txpayloads<1, 127:64>=amp_tx_5<63:0>
am_txpayloads<1, 129:128>=amp_tx_7<59:58>
am_txpayloads<2, 63:0>=amp_tx_2<63:0>
am_txpayloads<2, 127:64>=amp_tx_6<63:0>
am_txpayloads<2, 129:128>=amp_tx_7<61:60>
am_txpayloads<3, 63:0>=amp_tx_3<63:0>
am_txpayloads<3, 119:64>=amp_tx_7<55:0>
am_txpayloads<3, 121:120>=amp_tx_7<63:62>

Given i=0 to 3, k=0 to 12, and y=i+4k, am_txmapped<511:0> is constructed from am_txpayloads as follows:

If (y<51) then am_txmapped< (10y+9): 10y>=am_txpayloads<i, (10k+9): 10k>
am_txmapped<511:510>=am_txpayloads<3, 121:120>

A 2-bit pad is appended to the mapped alignment markers to yield the equivalent of two 257-bit blocks. The pad bits, am_txmapped<512:513>, are set to 01 or 10 in an alternating pattern, in an embodiment.

Referring now to FIGS. 2 and 5, the alignment lock circuit 140 inserts the remapped AMs (e.g., am_txmapped<513:0) into the data path (prior to encoding by the FEC encoder 144) every 80*n 66-bit blocks, where n is a suitable integer corresponding to every n FEC codewords. In an embodiment, n is 800. In other embodiments, n is set to another suitable integer. In an embodiment, the mapped AM, am_txmapped<513:0> are inserted as the first-occurring 514 message bits to be transmitted every n-th FEC codeword. The first 257-bit block inserted after am_txmapped <513:0> corresponds to the four 66-bit blocks received on 10 G lanes 0, 1, 2, and 3 that immediately followed the alignment marker on each respective 10 G lane, in an embodiment. The result of the AM mapping process is that, after FEC encoding and symbol distribution (to be described further below), the AM bit patterns appear on four FEC output lanes output by the FEC encoder 144 aligned with the start of every n-th FEC codeword. A receiver device can use the AM bit pattern to lock onto the four FEC output lanes and to identify and lock (i.e., synchronize) to the FEC codeword boundaries.

An additional result of this AM mapping process described above is that the AMs (including the BIP3 and BIP7 fields) are carried across the link protected by FEC. These fields cannot be used to monitor errors on the link protected by FEC as the 66-bit to 257-bit transcoding and the FEC encoding alters the bit sequence. However, these fields may again be used to monitor errors after the original bit sequence is restored, i.e., following FEC decoding and a 257-bit to 66-bit transcoding at the receiver.

The alignment lock circuit 140 outputs data to the FEC circuit in 257-symbol blocks, where each symbol has a suitable size such as 10 bits or another suitable size.

The FEC circuit 144 is configured to encode pairs of 257-symbol blocks (e.g., blocks of 514 symbols), according to a suitable FEC code, to generate FEC codewords having a larger size. As an illustrative example, the FEC encoder circuit 144 encode pairs of 257-symbol blocks (e.g., blocks of 514 symbols) according to a Reed-Solomon (n, 514) code that generates an n-symbol FEC codeword, where n is a suitable integer. In an embodiment, n is 528. In another embodiment, n is 544. In other embodiments, FEC codes corresponding to other suitable values of n are utilized. In other embodiments, other suitable FEC codes are utilized.

The FEC circuit 144 is configured to distribute each FEC codeword to the four FEC lanes by distributing 10-bit blocks to the four FEC lanes in a round-robin manner. Additionally, the FEC circuit 144 is configured to distribute AM data, such as illustrated in FIG. 6A, to the four FEC lanes by distributing 10-bit blocks to the four FEC lanes in a round-robin manner.

Figure 6A:
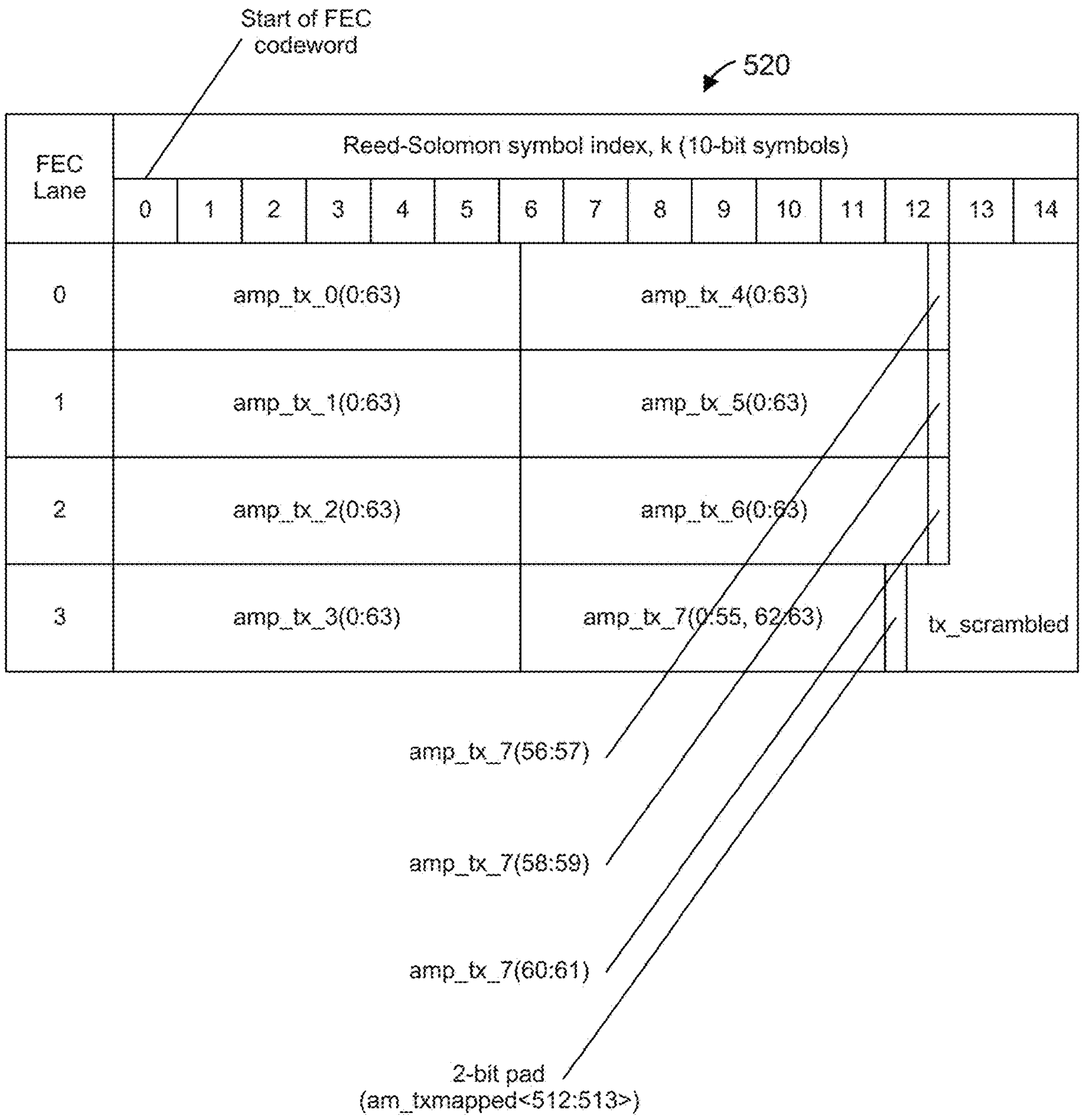
FIG. 6A is a table that illustrates an example of a mapping of the AMs by the interface device of FIG. 2, according to an embodiment.

FIG. 6A is a table 520 that illustrates the mapping of the AMs by the alignment lock circuit 140 discussed above, according to an embodiment. In FIG. 6A, am_tx_x<65:0> is an alignment marker for a 10 G lane x, x=0 to 7, where bit 0 is the first bit transmitted. As illustrated in FIG. 6A, bits of the alignment marker amp_tx_7, which is the alignment marker corresponding to 10 G lane seven, are distributed across the four FEC lanes output by the FEC circuitry 144. For example, two bits of the alignment marker amp_tx_7 (in particular, bits 56:57) are distributed to FEC lane 0; two bits of the alignment marker amp_tx_7 (in particular, bits 58:59) are distributed to FEC lane 1; two bits of the alignment marker amp_tx_7 (in particular, bits 60:61) are distributed to FEC lane 2; and the remaining bits of the alignment marker amp_tx_7 (in particular, bits 0:55 and 62:63) are distributed to FEC lane 3.

Figure 6B:
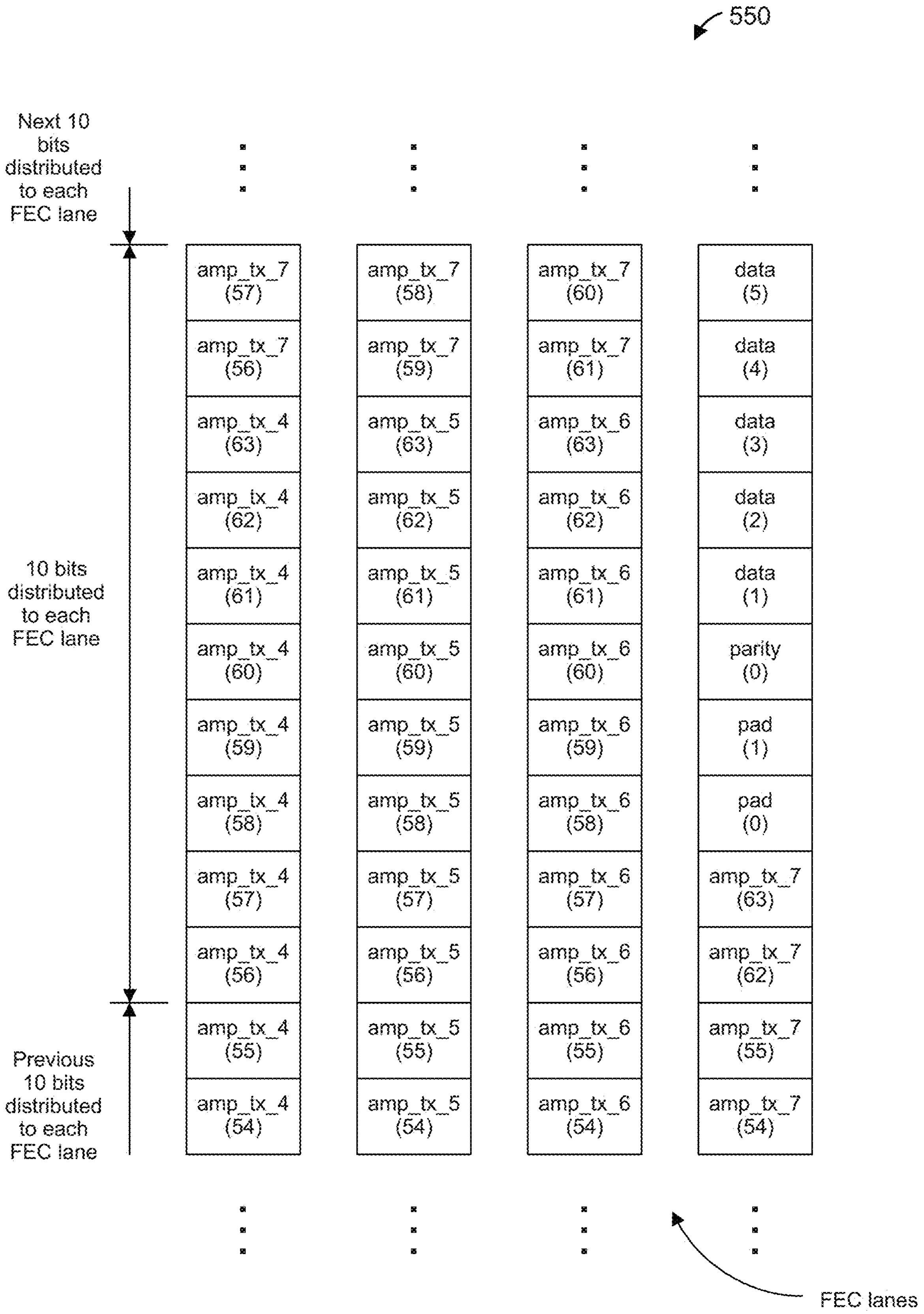
FIG. 6B is a diagram that illustrates the example mapping of the AMs to lanes output by a forward error correction (FEC) circuitry of FIG. 2, according to an embodiment.

FIG. 6B is a simplified diagram showing the alignment markers after being distributed by the FEC circuit 144 to the FEC lanes in 10-bit chunks, according to an embodiment. As illustrated in FIG. 6B, bits of the alignment marker amp_tx_7 are distributed across the four FEC lanes output by the FEC circuitry 144.

The multiplexer 148 receives outputs of the FEC encoder 144 (in multiple FEC lanes) and multiplexes data output via the FEC lanes into a single data stream. In an embodiment, the multiplexer 148 selects bits from each of the FEC lanes in a round-robin manner for output to the SERDES 132. In another embodiment, the multiplexer 148 multiplexes data output via the FEC lanes into a single data stream in another suitable manner.

In another embodiment, the multiplexer 148 is omitted and the FEC circuit 144 outputs data from FEC codewords and the AMs as a single stream without distributing to the four FEC lanes as described above.

Figure 7:
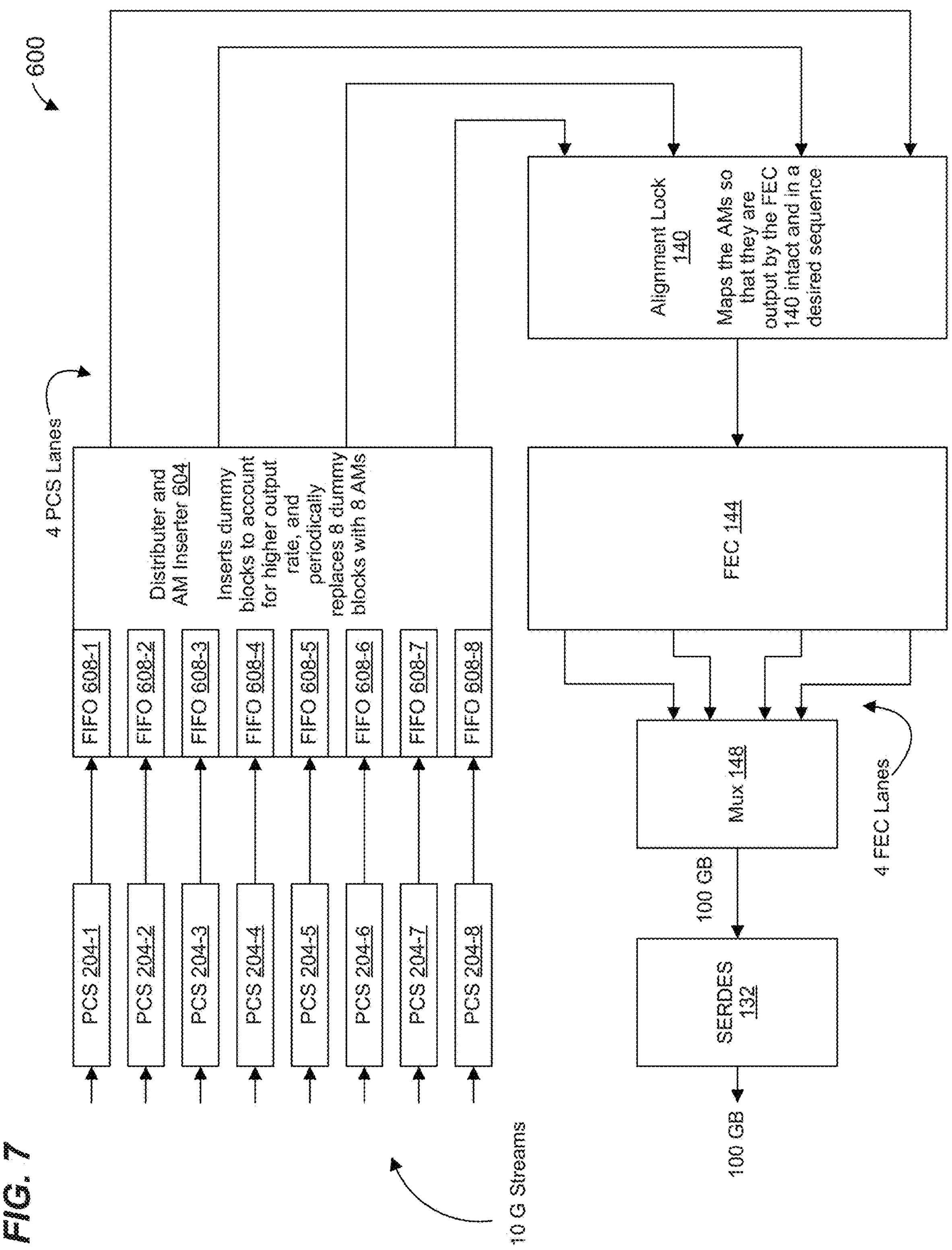
FIG. 7 is a simplified diagram of another example system having an example interface device that multiplexes data from eight 10.3125 Gbps input data streams to a single SERDES, according to another embodiment.

FIG. 7 is a simplified diagram of another example interface device 600 that is used in the system 100 and/or the system 160 as the interface device 104, according to an embodiment. In other embodiments, the interface device 600 is used in another suitable system different than the system 100 of FIG. 1A and the system 160 of FIG. 1B. In other embodiments, the system 100 includes another suitable interface device different than the interface device 600.

The interface device 600 is configured to multiplex eight up to 10 G data streams into a single 100 G data stream, as will be described below, according to an embodiment.

The interface device 600 is similar to the interface device 200 of FIG. 2, and like-numbered elements are not described again in detail for purposes of brevity.

The interface device 600 includes a distribution and AM insertion circuit 204 (the "distribution circuit 204") that is configured to distribute data from the 10 G streams received from the switch device 108 to fewer PCS lanes, e.g., four PCS lanes. Additionally, the distribution circuit 204 inserts AMs into the data from the 10 G streams received from the switch device 108 to help maintain alignment of data from the eight 10 G streams during subsequent processing by the interface device 600.

The distribution circuit 604 includes a plurality of first-in-first-out (FIFO) buffers 608, each FIFO buffer 608 receiving a respective 10 G stream. Data corresponding to the 10 G streams is written into each FIFO buffer 608 at a rate corresponding to 10 G. On the other hand, the distribution circuit 600 is configured to read data from each FIFO buffer 608 at a rate corresponding to 5/4*10 G, to account for the difference between the 80 G cumulative data rate of the eight 10 G input streams and the 100 G output stream.

In an embodiment, for every four 66-bit blocks read from each FIFO buffer 608, the distribution circuit 604 pauses reading from the FIFO buffer 608 and instead inserts a dummy 66-bit block into the output of the corresponding data stream. In this manner, the cumulative 80 G of data from the input streams are "padded" to reach 100 G, i.e., the dummy 66-bit blocks "fill in" the remaining 20 G.

Figure 8:
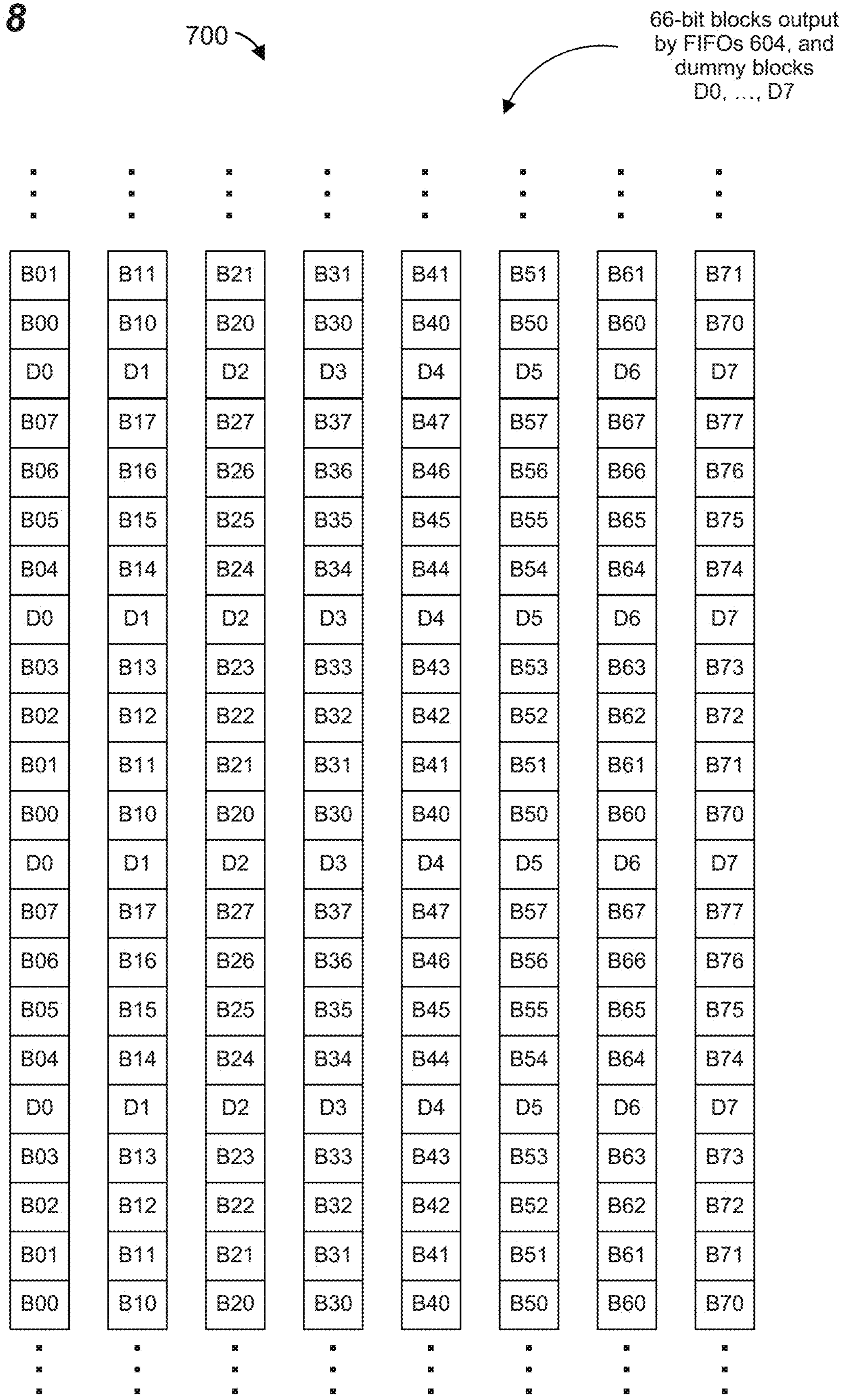
FIG. 8 is a diagram that illustrates an example of inserting dummy blocks into streams of bit blocks read from the first-in-first-out (FIFO) buffers of the system of FIG. 7, according to an embodiment.

FIG. 8 is a diagram that illustrates an example of inserting dummy blocks into streams of 66-bit blocks read from the FIFO buffers 608. In the example of FIG. 8, in each stream of 66-bit blocks, a dummy 66-bit block (e.g., D0, D1, D2, . . . , etc.) is inserted into the corresponding data stream after reading four 66-bit blocks from the corresponding FIFO buffer 608. Next, four more 66-bit blocks are read from the corresponding FIFO buffer 608, and a dummy 66-bit block is inserted into the corresponding data stream, and so on.

Figure 9:
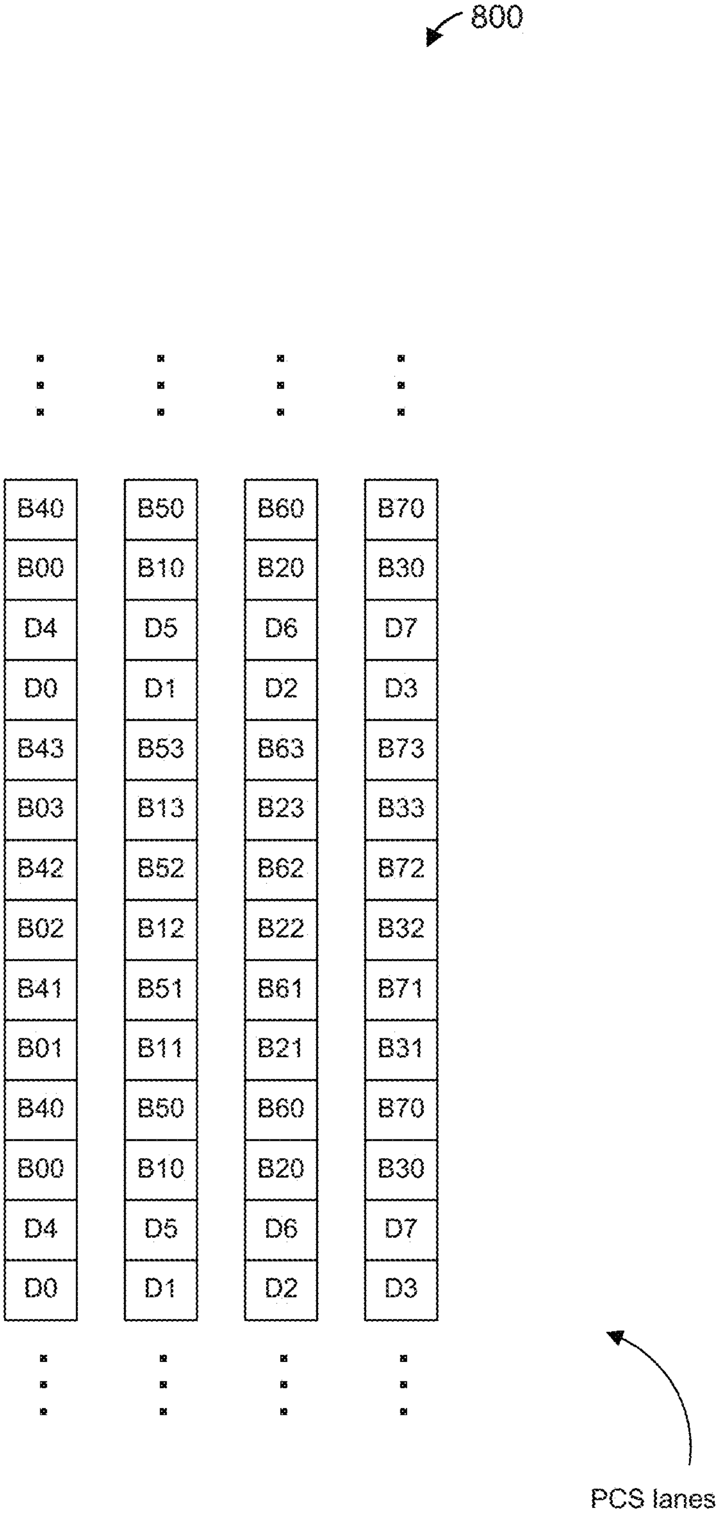
FIG. 9 is a diagram that illustrates an example of bit blocks after having been distributed to the four PCS lanes in the system of FIG. 7, according to an embodiment.

After inserting dummy blocks into the 10 G data streams, the distribution circuit 604 distributes the 66-bit blocks (including the dummy blocks) to four PCS lanes. In an embodiment, the distribution of the 66-bit blocks (including the dummy blocks) to the four PCS lanes is performed in a manner such as described above with reference to FIG. 3. In other embodiments, the 66-bit blocks are distributed to the PCS lanes in another suitable manner. FIG. 9 is a diagram that illustrates an example of the 66-bit blocks (including the dummy blocks) after having been distributed to the four PCS lanes, according to an embodiment.

Figure 10:
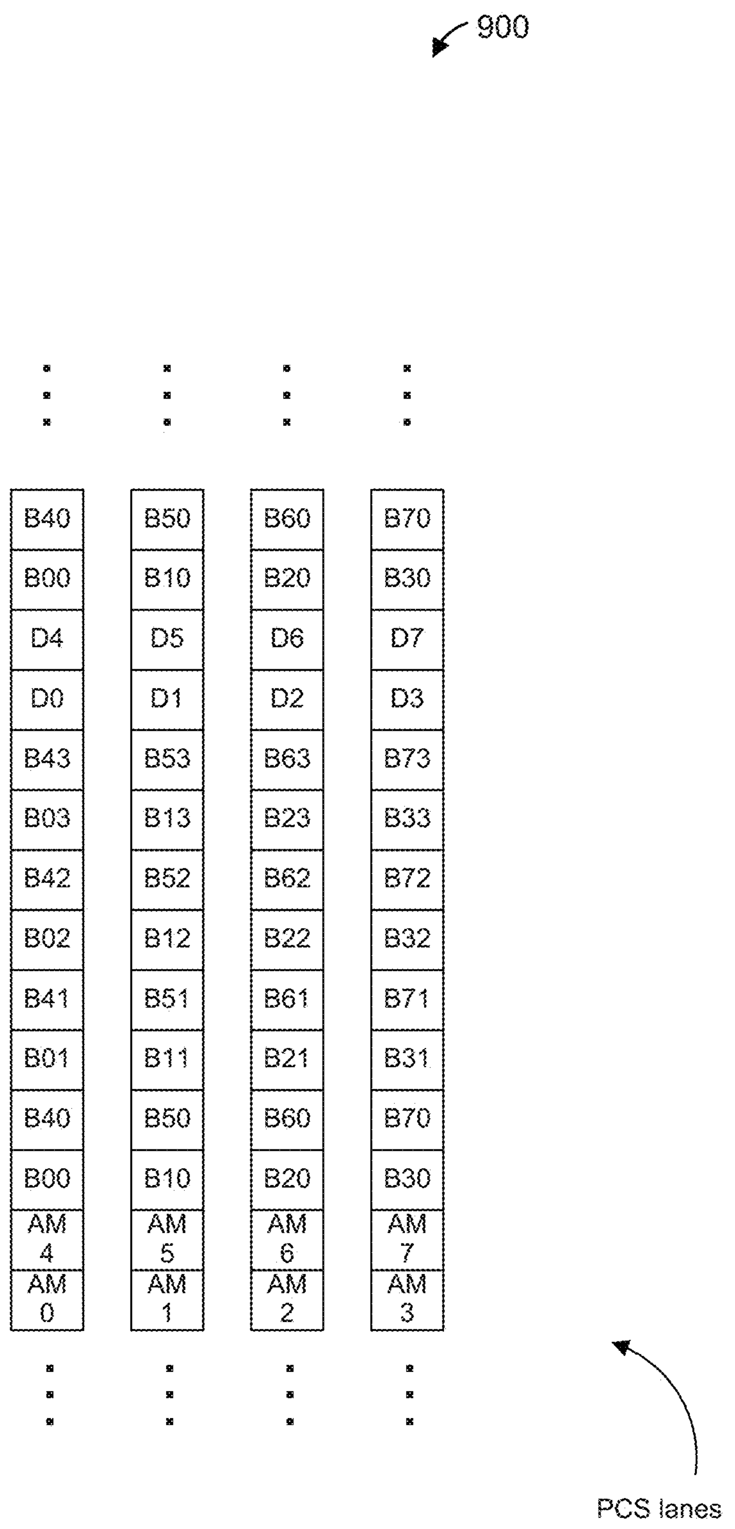
FIG. 10 is a diagram that illustrates an example of the PCS lanes in the example system of FIG. 7 after dummy blocks have been periodically replaced with AMs, according to an embodiment.

After distributing the 66-bit blocks (including the dummy blocks) to the four PCS lanes, the distribution circuit 604 periodically replaces a set of eight dummy blocks with eight AMs. FIG. 10 is a diagram that illustrates an example of the PCS lanes after dummy blocks have been periodically replaced with AMs, according to an embodiment.

Referring again to FIG. 7, the alignment lock circuit 140, the FEC encoder circuit 144, the multiplexer 148, and the SERDES 132 operate in a manner similar to the operations described above, but at a higher rate that corresponds to 100 G.

Figure 11:
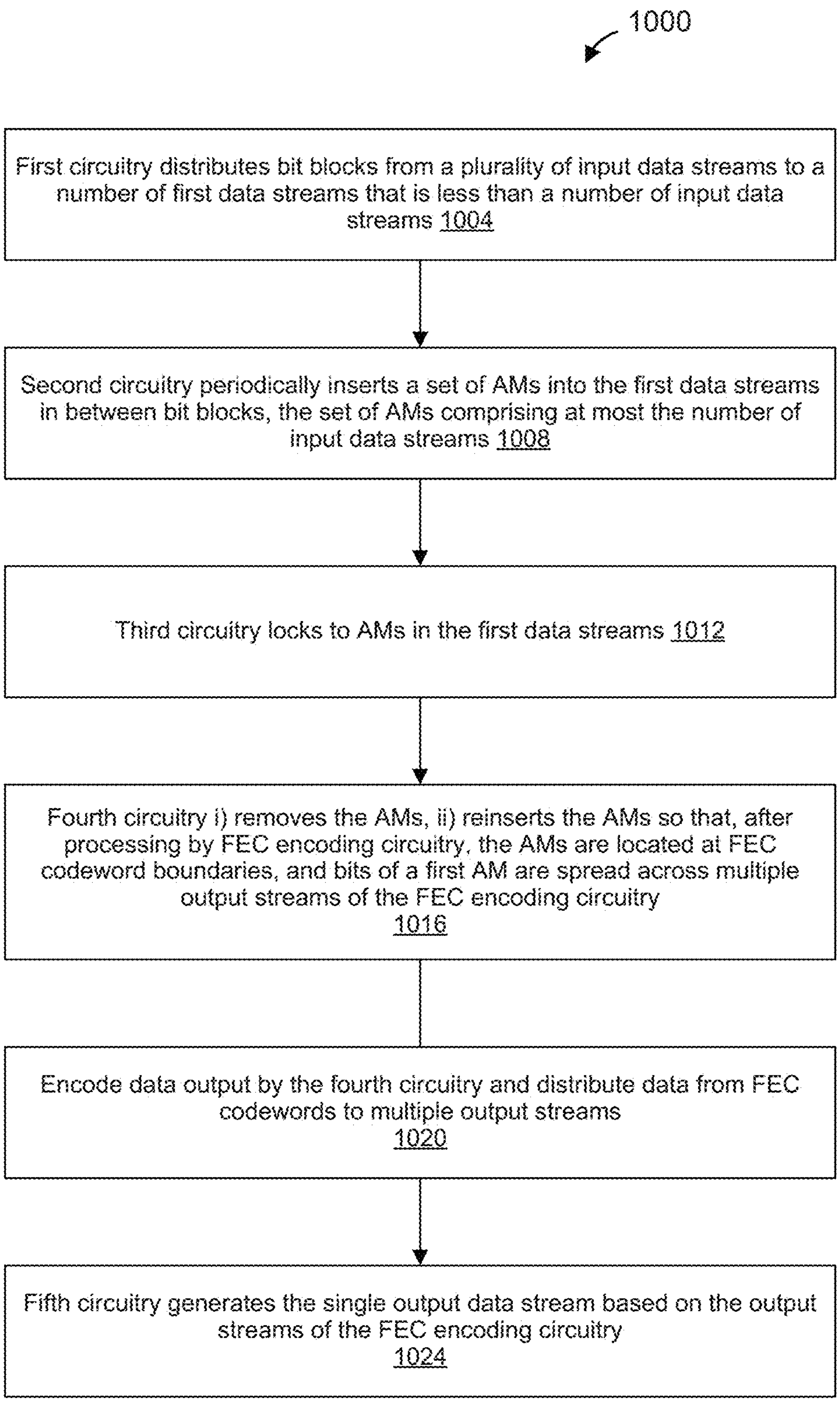
FIG. 11 is a flow diagram of an example method for converting a plurality of input data streams into a single output data stream, according to an embodiment.

FIG. 11 is a flow diagram of an example method 1000 for converting a plurality of input data streams into a single output data stream, according to an embodiment. The method 1000 is implemented by the example interface device 104 of FIGS. 1A-B, in some embodiments. The method 1000 is implemented by the example interface device 200 of FIG. 2, in another embodiment. The method 1000 is implemented by the example interface device 600 of FIG. 7, in another embodiment. In other embodiments, the method 1000 is implemented by another suitable interface device different than the interface devices 104, 200, 600 of FIGS. 1A-B, 2, and 6. In other embodiments, any of the interface devices 104, 200, 600 of FIGS. 1A-B, 2, and 6 operate according to another suitable method different than the method 1000.

At block 1004, first circuitry distributes bit blocks from a plurality of input data streams to a number of first data streams that is less than a number of input data streams. In an embodiment, block 1004 includes distributing eight input data streams to four first data stream.

At block 1008, second circuitry periodically inserts a set of AMs into the first data streams in between bit blocks, the set of AMs comprising at most the number of input streams. In an embodiment in which the number of input streams is eight, block 1008 includes inserting a set of eight AMs into the first data streams.

At block 1012, third circuitry locks to the AMs in the first data streams.

At block 1016, after the third circuitry locks to the AMs in the first data streams, fourth circuitry remove the AMs, and reinserts the AMs so that, after being processed by FEC encoding circuitry of the interface device, the AMs are located at FEC codeword boundaries and bits of a first AM, among the set of AMs, are spread across multiple outputs streams of the FEC encoding circuitry.

At block 1020, the FEC encoding circuitry encodes data output by the fourth circuitry to generate FEC codewords, and distributes data from FEC codewords to multiple output streams.

At block 1020, fifth circuitry generates the single output data stream based on the multiple output streams of the FEC encoding circuitry.

In another embodiment, the method 1000 further comprises removing, by the second circuitry, idle data corresponding to interpacket gaps (IPGs) in the input data streams to make room in the first data streams for the sets of AMs.

In another embodiment, the method 1000 further comprises: periodically inserting, by the second circuitry, dummy bit blocks between bit blocks from the input streams. In an embodiment, periodically inserting the set of AMs comprises periodically replacing a respective set of dummy bit blocks with a respective set of AMs.

In another embodiment, the method 1000 further comprises: writing data from the input streams to respective FIFO buffers at a first rate; reading data from the FIFO buffers at a second rate higher than the first rate; periodically pausing reading data from the FIFO buffers to generate respective second data streams; and distributing data from the second data streams to the first data streams. In an embodiment, periodically inserting the dummy bit blocks into the internal data streams comprises periodically inserting the dummy bit blocks in connection with periodically pausing the reading of data from the FIFO buffers.

In another embodiment, the method 1000 further comprises: receiving eight input data streams each at a data rate of 10.3125 gigabits per second (Gbps). Distributing the bit blocks comprises distributing the bit blocks from the eight input data streams to four first data streams; and generating the single output data stream comprises generating the single output data stream to have a data rate of 82.5 Gbps, according to an embodiment.

In another embodiment, the method 1000 further comprises: receiving eight input data streams each at a data rate of 10 G; wherein distributing the bit blocks comprises distributing the bit blocks from the eight input data streams to four first data streams; and wherein generating the single output data stream comprises generating the single output data stream to have a data rate of 100 G.

In another embodiment, the method 1000 further comprises: generating, by a SERDES coupled to the fifth circuitry, a serial data stream based on the single output data stream.

Figure 12:
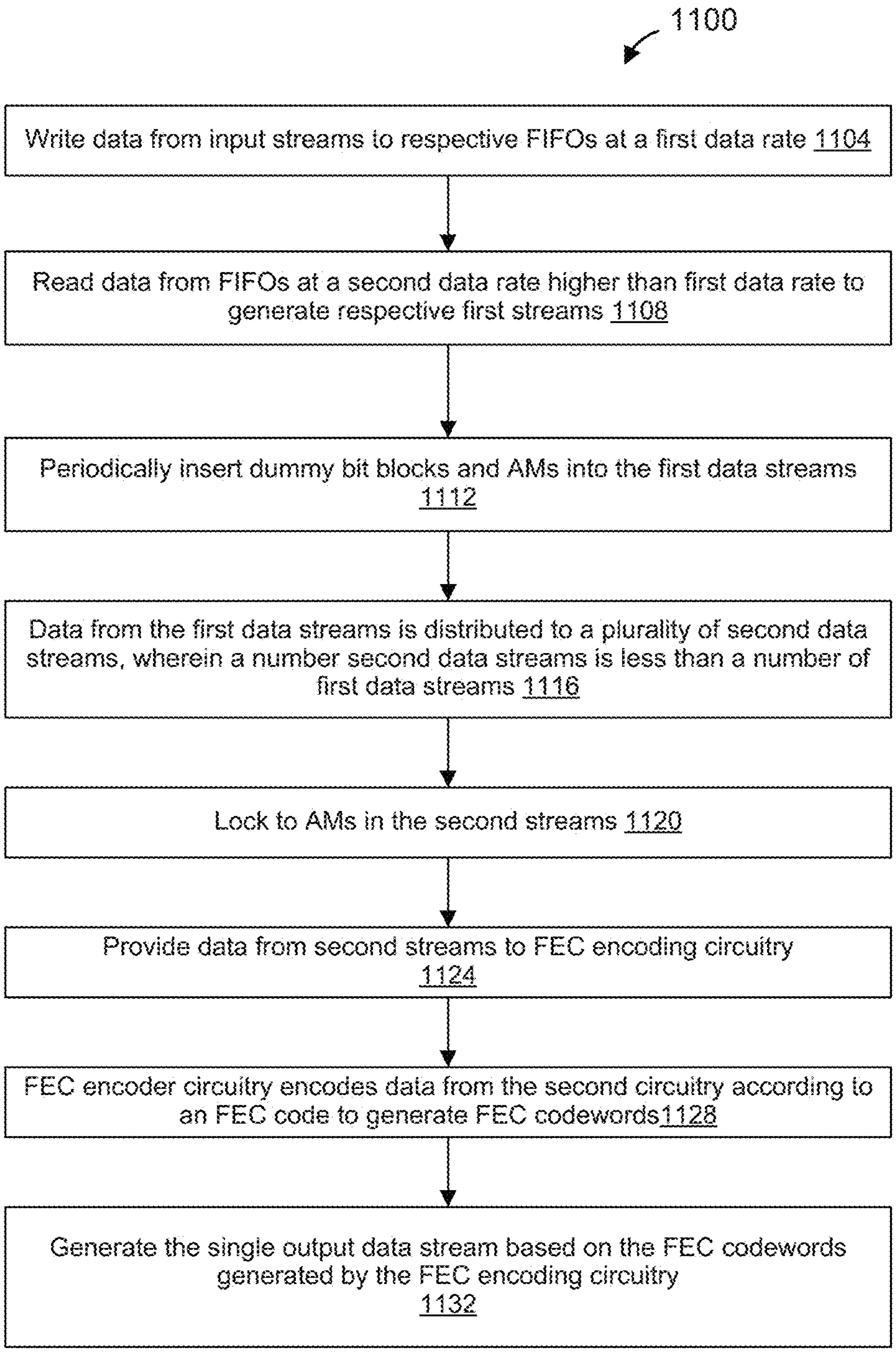
FIG. 12 is a flow diagram of another example method for converting a plurality of input data streams into a single output data stream, according to another embodiment.

FIG. 12 is a flow diagram of another example method 1100 for converting a plurality of input data streams into a single output data stream, according to an embodiment. The method 1100 is implemented by the example interface device 104 of FIGS. 1A-B, in some embodiments.

The method 1000 is implemented by the example interface device 600 of FIG. 7, in another embodiment. In other embodiments, the method 1000 is implemented by another suitable interface device different than the interface devices 104, 200, 600 of FIGS. 1A-B and 6. In other embodiments, any of the interface devices 104, 600 of FIGS. 1A-B and 6 operate according to another suitable method different than the method 1100.

At block 1104, data from a plurality of input streams is written to respective FIFO buffers at a first rate.

At block 1108, data is read from the FIFO buffers at a second rate higher than the first rate to generate respective first data streams.

At block 1112, first circuitry periodically inserts dummy bit blocks and AMs into the first data streams.

At block 1116, the first circuitry distributes data from the first data streams to a plurality of second data streams, wherein a number second data streams is less than a number of first data streams.

At block 1120, second circuitry locks to the AMs in the second data streams.

At block 1124, the second circuitry provides data in the second streams to FEC encoder circuitry.

At block 1128, the FEC encoder circuitry encodes data from the second circuitry according to an FEC code to generate FEC codewords.

At block 1132, third circuitry generates the single output data stream based on the FEC codewords generated by the FEC encoding circuitry.

In another embodiment, the method 1100 further comprises: periodically pausing reading data from the FIFO buffers; and periodically inserting, by the first circuitry, the dummy bit blocks into the first data streams in connection with periodically pausing the reading of data from the FIFO buffers.

In another embodiment, periodically inserting AMs at block 1112 comprises: periodically replacing a set of dummy bit blocks with the AMs.

In another embodiment, writing data from the plurality of input streams to the respective FIFO buffers at block 1104 comprises writing data from the plurality of input streams to the respective FIFO buffers at a data rate of 10.3125 Gbps (e.g., 10 G); and reading data from the FIFO buffers at block 1108 comprises reading data from the FIFO buffers at a data rate of 12.375 Gbps.

In another embodiment, the method 1100 further comprises generating, by a SERDES, the serial data stream based on the single output data stream.

Figure 13:
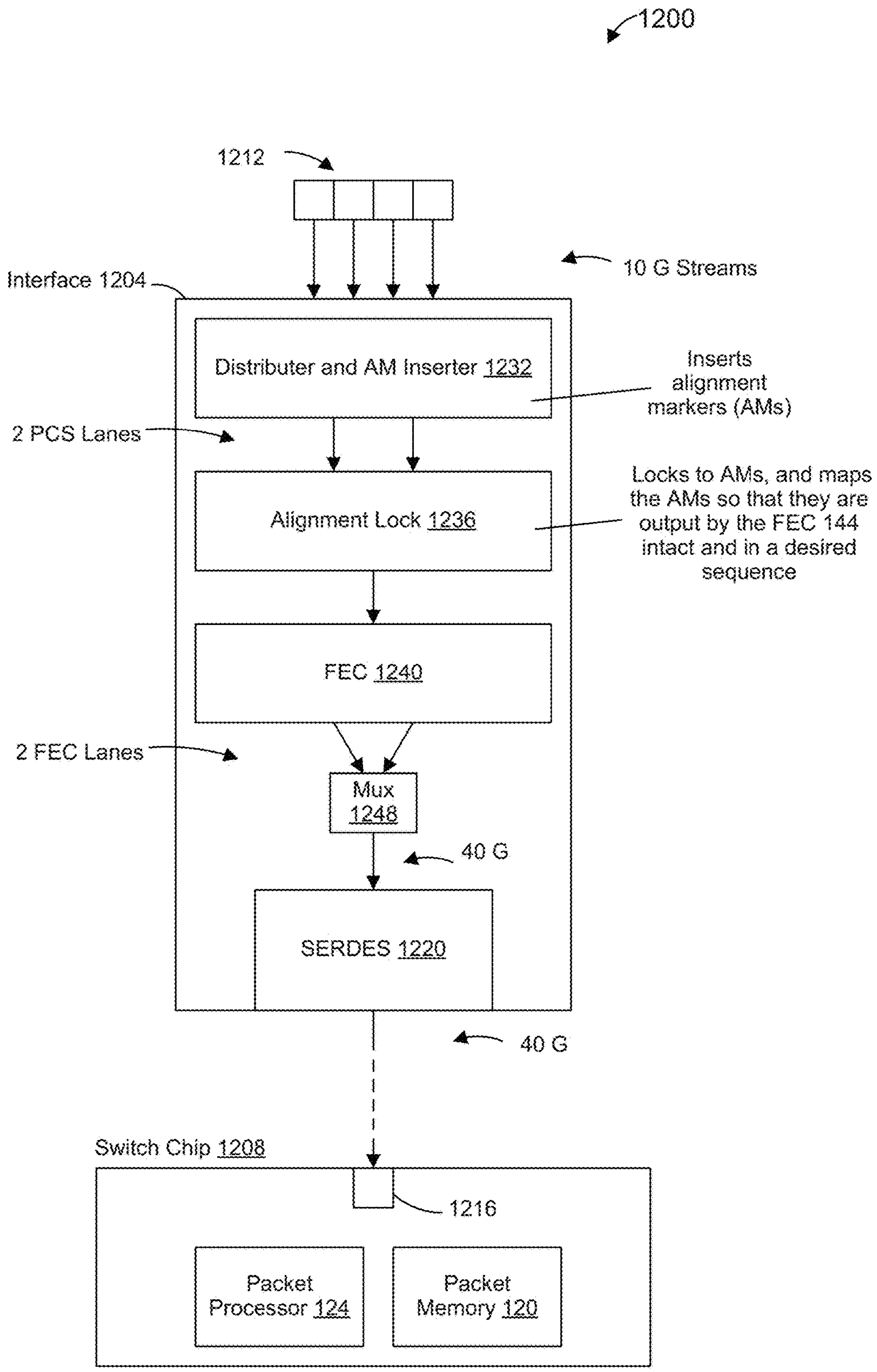
FIG. 13 is a simplified diagram of another example system in which an example interface device multiplexes data from multiple input data streams to a single SERDES, according to another embodiment.

FIG. 13 is a simplified diagram of another example system 1200 in which an example interface device 1204 multiplexes data from four 10 G input data streams to a single SERDES, according to another embodiment. The interface device 1204 interfaces a switch chip 1208 with a plurality of network ports 1212. The switch chip 1208 has a structure similar the network switch 104 of FIG. 1A, and like-numbered elements are not described again in detail for purposes of brevity.

The network switch 108 includes a plurality of network interfaces 1216 that are configured to communicatively couple with a plurality of network links, as will be described further below. In an embodiment, each of at least some of the network interfaces 1216 is configured to communicate at data rates of up to 40 G. In another embodiment, each of at least some of the network interfaces 1216 is configured to communicate at other suitable data rates. Although one network interface 1216 coupled to the interface device 1204 is illustrated in FIG. 13, the switch chip 1208 includes additional network interfaces 1216 (not shown) coupled to one or more other interface devices (not shown) distinct from the interface device 1204, in an embodiment.

The switch chip 1208 is included within in a suitable chip package having suitable external interconnect structures for inputting and outputting signals to/from the switch chip 1208, such as a BGA, a PGA, etc.

The network ports 1212 are optical ports, in an embodiment. In other embodiments, the network ports 1212 are electrical ports.

The ports 1212 are configured to communicatively couple with a plurality of network links. In an embodiment, each of at least some of the ports 1212 is configured to communicate at data rates of up to 10 G. In other embodiments, each of at least some of the ports 1212 is configured to communicate at other suitable data rates. Although four ports 1212 coupled to the interface device 1204 are illustrated in FIG. 13, the system 1200 includes additional ports 1212 coupled to one or more other interface devices (not shown) distinct from the interface device 1204, in an embodiment.

In an embodiment, each of at least some of the ports 1212 is configured to output a respective 10 G data stream, at least in some scenarios. In an embodiment, each of at least some of the ports 1212 is configured to output a respective data stream at different data rates, including at 10 G, 5 Gbps (5 G), 2.5 G, 1 G, 100 M, and 10 M, depending on a scenario in which the system 160 is operating. In an embodiment, each port 1212 is configured to handle data according to two or more of: i) 10GBASE-T, ii) 5GBASE-T, iii) 2.5GBASE-T, iv) 1GBASE-T, v) 100BASE-T, vi) 10BASE-T, etc. In other embodiments, each port 1212 is configured to handle data according to one or more other suitable types of cables and/or data rates.

The interface device 1204 is configured to multiplex the four 10 G data streams from the ports 1212 into a single 40 G data stream. A SERDES 1220 generates a serial data stream that is suitable for conveying the single data stream over a physical distance between the interface device 1204 and the switch chip 1208.

By multiplexing multiple data streams into a single, higher data rate stream, a number of external connections (e.g., pins, balls, etc.) of the switch chip 1208 can be reduced, at least in some embodiments. For instance, with many IC fabrication and/or chip packaging technologies, it is difficult to produce, in a commercially viable manner, a chip package having a switch IC large numbers of high speed external connections. By multiplexing multiple data streams into a single, higher data rate stream with the interface device 1204, the number of external connections required on the switch chip 1208 can be reduced, according to some embodiments.

The interface device 1204 includes a distribution and AM insertion circuit 1232 (the "distribution circuit 1232") that is configured to distribute data from the 10 G streams received from the switch device ports 1212 to fewer internal lanes (e.g., two internal lanes), e.g., PCS lanes, the PCS lanes carrying internal data streams. Additionally, the distribution circuit 1232 inserts AMs into the data from the 10 G streams received from the ports 1212 to help maintain alignment of data from the four 10 G streams during subsequent processing by the interface device 1204. An amount of AMs added to the data from the 10 G streams is selected so that the AMs can be added by replacing idle data from IPGs between packets, in an embodiment.

An alignment lock circuit 1236 is coupled between the PCS lanes and an FEC circuit 1240. The alignment lock circuit 1240 is configured to achieve AM lock using the AMs added by the AM insertion circuit 1236, multiplex data from the PCS lanes into a single data stream, and remove the AMs. Additionally, the AM lock circuit 1236 is configured to re-insert the AMs into the single data stream so that, after the interface device 1204 multiplexes the data into a single output stream, the AMs are in aligned with FEC codeword boundaries within the single stream to allow a receiver device to use the AMs to identify FEC codeword boundaries and to properly demultiplex the single stream into the multiple, up to 10 G data streams. For example, because AMs are re-inserted at FEC codeword boundaries, the receiver device can use the AMs to identify the FEC codeword boundaries.

The FEC circuit 1240 is configured to encode, according to an FEC code, data from the alignment lock circuit 1236 to generate encoded data, and to distribute the encoded data among FEC output lanes. A multiplexer 1248 multiplexes the outputs of the FEC circuit 1240 into a single data stream. Because of the remapping of the AMs by the alignment lock circuit 1236, as discussed above, the AMs are in proper position within the single stream output by the multiplexer 1248 to allow a receiver device to use the AMs to properly demultiplex the single stream into the four 10 G data streams.

Figure 14:
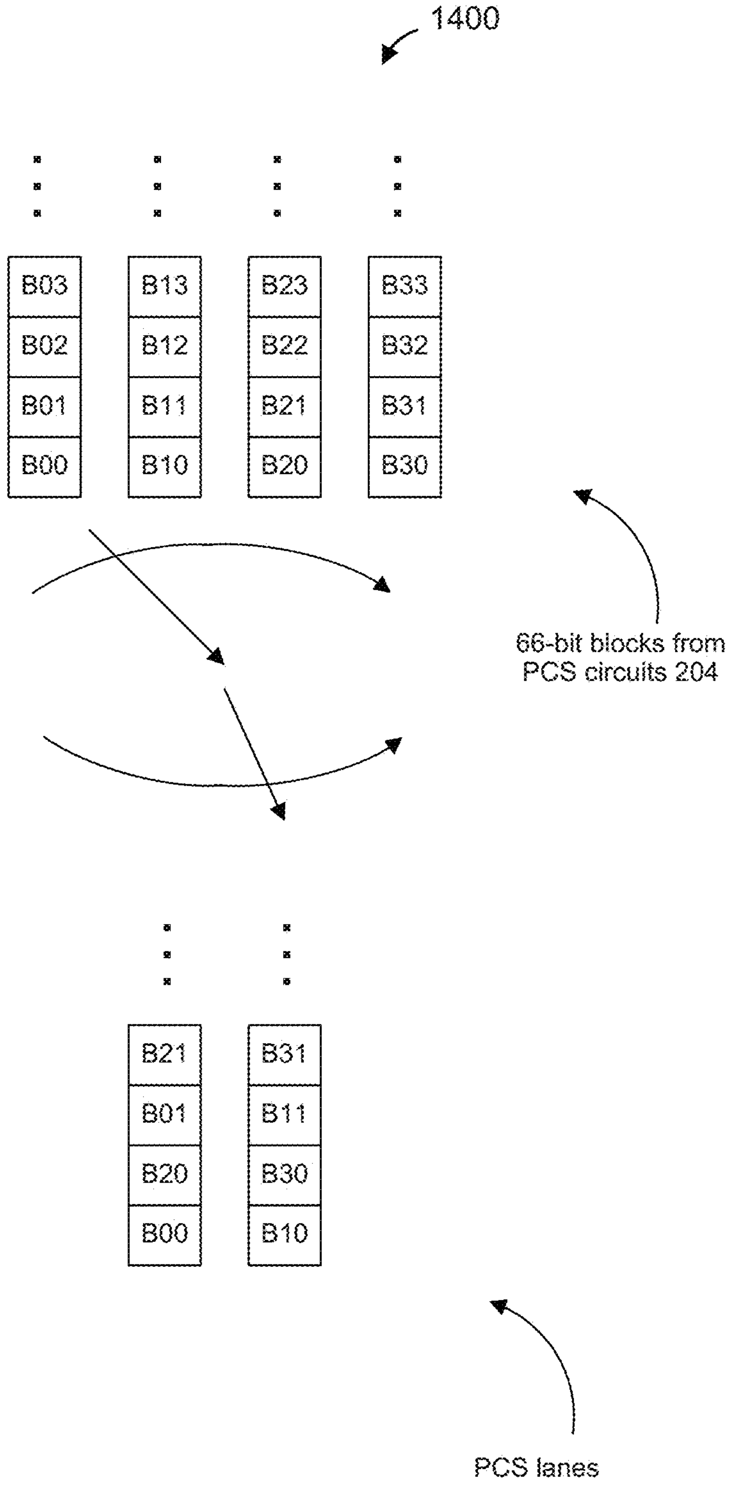
FIG. 14 is a diagram that illustrates an example distribution of bit blocks to PCS lanes performed by the interface device of FIG. 13, according to an embodiment.

The distribution circuit 1232 receives 66-bit blocks from the ports 1212 and distributes the 66-bit blocks to two PCS lanes. FIG. 14 is a diagram that illustrates an example distribution of 66-bit blocks to the two PCS lanes performed by the distribution circuit 1232, according to an embodiment. In the example of FIG. 14, 66-bit blocks are selected in a round-robin manner, and selected 66-bit blocks distributed to the PCS lanes in round-robin manner. In other embodiments, the 66-bit blocks are distributed to the PCS lanes in another suitable manner.

Figure 15:
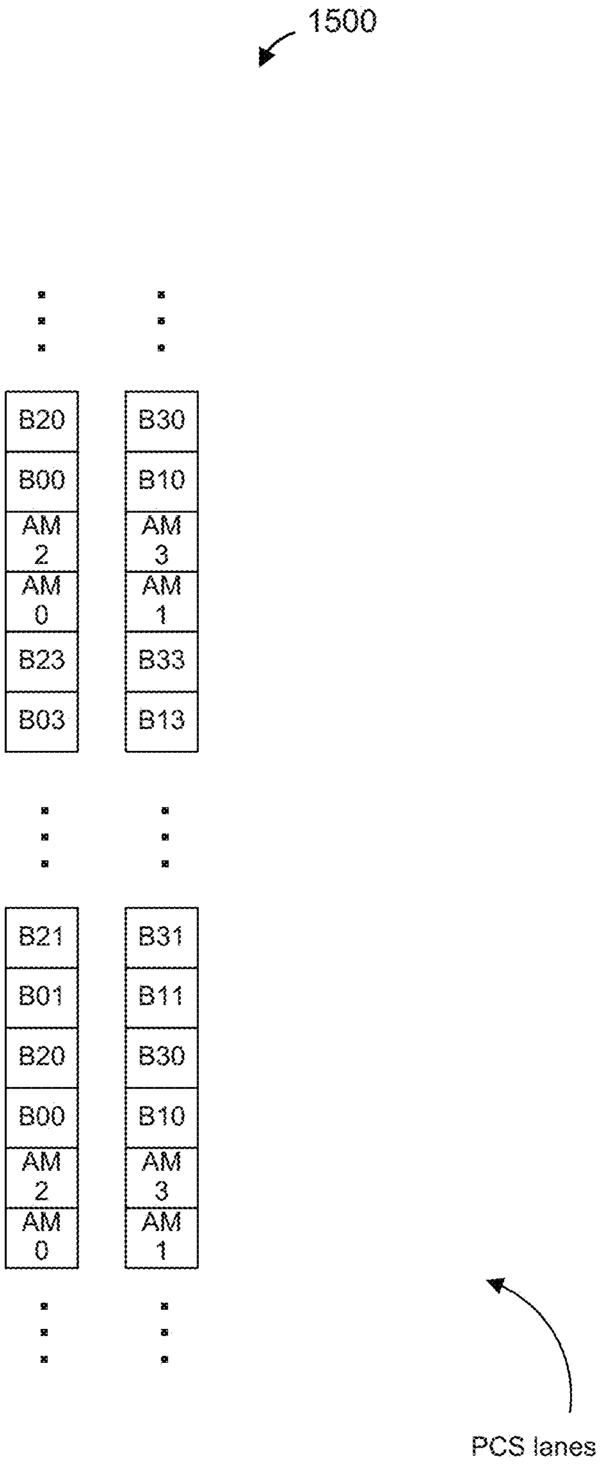
FIG. 15 is a diagram that illustrates an example of periodically inserting AMs in two PCS lanes performed by the interface device of FIG. 13, according to an embodiment.

Referring again to FIG. 13, the distribution circuit 1232 periodically inserts AMs into the PCS streams as generally discussed above. FIG. 15 is a diagram that illustrates an example of the distribution circuit 1232 periodically inserting AMs in two PCS lanes, according to an embodiment. Each AM consists of 66 bits (i.e., 8 bytes plus 2 bits) and includes a control block sync header, in an embodiment. In an embodiment, the distribution circuit 1232 inserts a block of AMs into both of the PCS lanes in parallel.

To make room in the streams of 66-bit blocks for the AMs, idle characters corresponding to IPGs are periodically removed from the streams, in an embodiment. The IEEE 802.3 Standard specifies that IPGs have an average duration of 12 bytes. Therefore, there are sufficient bytes in an IPG eligible for removal to make room for an AM of approximately 8 bytes.

The alignment lock circuit 1236 is configured to achieve lock (i.e., synchronize) to the 66-bit blocks in each PCS lane, and achieve lock (i.e., synchronize) to the AMs.

After achieving lock to the 66-bit blocks and to the AMs, the alignment lock circuit 1236 is configured to multiplex data from the PCS lanes into a single FEC input stream and remove the AMs.

Further, the alignment lock circuit 1236 is configured to perform a transcoding process to transcode sets of four 66-bit blocks in the FEC input stream into 257-bit blocks.

In an embodiment, the alignment lock circuit 1236 is configured to map information in the AMs that were removed to new AMs, and to insert the new AMs into the FEC input stream. As a result of the mapping to new AMs and insertion of the new AMs, after the interface device 1204 multiplexes the data into a single output stream, the AMs are aligned to FEC codeword boundaries within the single stream to allow a receiver device to use the AMs to identify FEC codeword boundaries and to properly demultiplex the single stream into the eight up to 10 G data streams. More specifically, the alignment marker mapping/insertion function compensates for operation of a symbol distribution function to be performed after FEC encoding (as is discussed further below) and rearranges the AM bits so that the AMs appear on the FEC output lanes intact and in a desired sequence, which preserves properties of the alignment markers (e.g., DC balance and transition density) and provides a deterministic pattern for the purpose of synchronization. A device that receives the data uses knowledge of the AM mapping to identify FEC codeword boundaries, in an embodiment.

As part of the alignment marker mapping, the AMs that were removed (am_tx_x<65:0> is an alignment marker for a 10 G lane x, x=0 to 3, where bit 0 is the first bit transmitted) are mapped to a 257-bit value am_txmapped<256:0> in a manner that yields the same result as the following process:

For x=0 to 3, amp_tx_x<63:0>:

Set y=0 when x≤1, otherwise set y=x.

amp_tx_x<23:0> is set to the values specified for M0, M1, and M2 amp_tx_x<31:24>=am_tx_x<33:26> amp_tx_x<55:32> is set to the values specified for M4, M5, and M6 amp_tx_x<63:56>=am_tx_x<65:58>

This process replaces the fixed bytes of the alignment markers received via the PCS lanes, possibly with errors, with the specified values M0, M1, M2, M4, M5, and M6. In addition, the fixed bytes of the AMs corresponding to 10 G lane 1 are replaced with the fixed bytes for the alignment marker corresponding to 10 G lane 0. The variable bytes of BIP3 and BIP7 are unchanged. This process simplifies receiver synchronization since the receiver only needs to search for the fixed bytes corresponding to 10 G lane 0.

The payloads am_txpayloads<0,129:0> and am_txpayloads<1,125:0> are then constructed from amp_tx_x as follows:

am_txpayloads<0, 63:0>=amp_tx_0<63:0> am_txpayloads<0, 127:64>=amp_tx_2<63:0> am_txpayloads<0, 129:128>=amp_tx_3<57:56> am_txpayloads<1, 63:0>=amp_tx_1<63:0> am_txpayloads<1, 119:64>=amp_tx_3<55:0> am_txpayloads<1, 125:128>=amp_tx_3<63:58>

Given i=0 to 1, k=0 to 12, and y=i+2k, am_txmapped<256:0> is constructed from am_txpayloads as follows:

If (y<25) then am_txmapped< (10y+9): 10y>=am_txpayloads<i, (10k+9): 10k> am_txmapped<255:250>=am_txpayloads<1, 125:120>

A 1-bit pad is appended to the mapped alignment markers to yield the equivalent of one 257-bit block. The pad bits, am_txmapped<256>, is set to 0 or 1 in an alternating pattern, in an embodiment.

Referring now to FIG. 13, the alignment lock circuit 1236 inserts the remapped AMs (e.g., am_txmapped<256:0) into the data path (prior to encoding by the FEC encoder 1240) every 1024 FEC codewords. In another embodiment, AMs are inserted at another suitable rate. In an embodiment, the mapped AM, am_txmapped<256:0> are inserted as the first-occurring 257 message bits to be transmitted every 1024-th FEC codeword. The first 257-bit block inserted after am_txmapped <256:0> corresponds to the four 66-bit blocks received on 10 G lanes 0, 1, 2, and 3 that immediately followed the alignment marker on each respective 10 G lane, in an embodiment. The result of the AM mapping process is that, after FEC encoding and symbol distribution (to be described further below), the AM bit patterns appear on two FEC output lanes output by the FEC encoder 1240 aligned with the start of every n-th FEC codeword. A receiver device can use the AM bit pattern to lock onto the two FEC output lanes and to identify and lock (i.e., synchronize) to the FEC codeword boundaries.

An additional result of this AM mapping process described above is that the AMs (including the BIP3 and BIP7 fields) are carried across the link protected by FEC. These fields cannot be used to monitor errors on the link protected by FEC as the 66-bit to 257-bit transcoding and the FEC encoding alters the bit sequence. However, these fields may again be used to monitor errors after the original bit sequence is restored, i.e., following FEC decoding and a 257-bit to 66-bit transcoding at the receiver.

The alignment lock circuit 1236 outputs data to the FEC circuit in 257-symbol blocks, where each symbol has a suitable size such as 10 bits or another suitable size.

The FEC circuit 1240 is configured to encode pairs of 257-symbol blocks (e.g., blocks of 514 symbols), according to a suitable FEC code, to generate FEC codewords having a larger size. As an illustrative example, the FEC encoder circuit 144 encode pairs of 257-symbol blocks (e.g., blocks of 514 symbols) according to a Reed-Solomon (n, 514) code that generates an n-symbol FEC codeword, where n is a suitable integer. In an embodiment, n is 544. In other embodiments, FEC codes corresponding to other suitable values of n are utilized. In other embodiments, other suitable FEC codes are utilized.

The FEC circuit 1240 is configured to distribute each FEC codeword to the two FEC lanes by distributing 10-bit blocks to the two FEC lanes in an alternating manner. Additionally, the FEC circuit 1240 is configured to distribute AM data, to the two FEC lanes by distributing 10-bit blocks to the two FEC lanes in an alternating manner.

Figure 16:
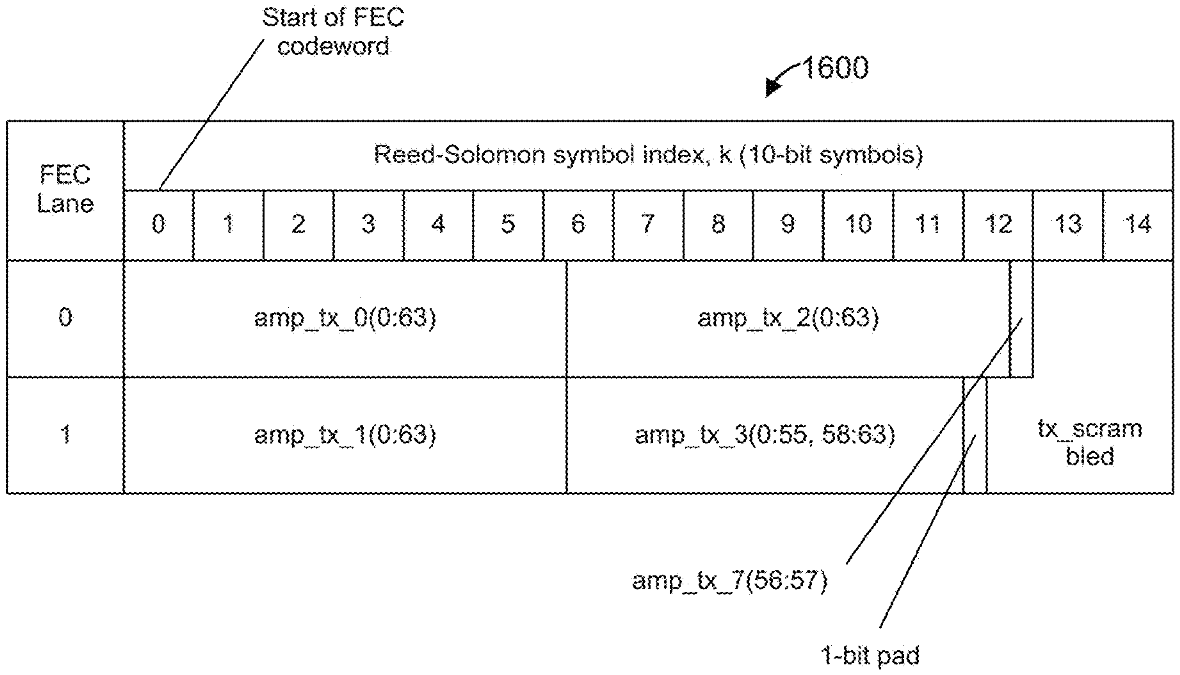
FIG. 16 is a table that illustrates an example of a mapping of the AMs by the interface device of FIG. 13, according to an embodiment.

FIG. 16 is a table 1600 that illustrates an example mapping of the AMs by the alignment lock circuit 1236 discussed above, according to an embodiment. In FIG. 16, am_tx_x<63:0> is an alignment marker for a 10 G lane x, x=0 to 3, where bit 0 is the first bit transmitted. As illustrated in FIG. 16, bits of the alignment marker amp_tx_3, which is the alignment marker corresponding to 10 G lane three, are distributed across the two FEC lanes output by the FEC circuitry 1240. For example, two bits of the alignment marker amp_tx_3 (in particular, bits 56:57) are distributed to FEC lane 0; and the remaining bits of the alignment marker amp_tx_3 (in particular, bits 0:55 and 58:63) are distributed to FEC lane 1.

Embodiment 1: An interface device for converting a plurality of input data streams into a single output data stream, the interface device comprising: first circuitry configured to receive a plurality of input data streams and to distribute bit blocks from the plurality of input data streams to a number of first data streams that is less than a number of input data streams in the plurality of input data streams; second circuitry configured to periodically insert a set of alignment markers (AMs) into the first data streams in between bit blocks, the set of AMs comprising at most the number of input data streams; third circuitry configured to lock to the AMs in the first data streams; fourth circuitry configured to, after locking to the AMs: remove the AMs, and reinsert the AMs so that after being processed by forward error correction (FEC) encoding circuitry, the AMs are located at an FEC codeword boundary and bits of a first AM, among the set of AMs, are spread across multiple outputs streams of the FEC encoding circuitry; the FEC encoding circuitry, the FEC encoding circuitry configured to i) encode data output by the fourth circuitry according to an FEC code to generate FEC codewords, and ii) distribute data from the FEC codewords to the multiple outputs streams of the FEC encoding circuitry; and fifth circuitry configured to generate the single output data stream based on the multiple output streams of the FEC encoding circuitry.

Embodiment 2: The interface device of embodiment 1, wherein the second circuitry is further configured to: remove idle data corresponding to interpacket gaps (IPGs) in the input data streams to make room for the sets of AMs in the first data streams.

Embodiment 3: The interface device of embodiment 1, wherein the second circuitry is further configured to: periodically insert dummy bit blocks between bit blocks from the input streams; and periodically replace a respective set of dummy bit blocks with a respective set of AMs.

Embodiment 4: The interface device of embodiment 3, wherein: the second circuitry comprises a plurality of first-in-first-out (FIFO) buffers that correspond to respective input streams; the second circuitry is further configured to: write data from the input streams to respective FIFO buffers at a first rate, read data from the FIFO buffers at a second rate higher than the first rate to generate respective second data streams, periodically pause reading data from the FIFO buffers, periodically insert the dummy bit blocks into the second data streams in connection with periodically pausing the reading of data from the FIFO buffers, and distribute data read from the second data streams to the first data streams.

Embodiment 5: The interface device of either of embodiments 3 or 4, wherein: the first circuitry configured to receive eight input data streams each at a data rate of 10.3125 gigabits per second (Gbps) and to distribute bit blocks from the eight input data streams to four first data streams; and the fifth circuitry configured to generate the single output data stream to have a data rate of 103.125 Gbps.

Embodiment 6: The interface device of either of embodiments 1 or 2, wherein: the first circuitry is configured to receive eight input data streams each at a data rate of up to 10.3125 gigabits per second (Gbps) and to distribute bit blocks from the eight input data streams to four first data streams; and the fifth circuitry configured to generate the single output data stream to have a data rate of 82.5 Gbps.

Embodiment 7: The interface device of any of embodiments 1-6, further comprising: a serializer/deserializer (SERDES) coupled to the fifth circuitry, the SERDES configured to generate a serial data stream based on the single output data stream.

Embodiment 8: A method for converting a plurality of input data streams into a single output data stream, the method comprising: distributing, by first circuitry of an interface device, bit blocks from a plurality of input data streams to a number of first data streams that is less than a number of input data streams in the plurality of input data streams; periodically inserting, by second circuitry, a set of alignment markers (AMs) into the first data streams in between bit blocks, the set of AMs comprising at most the number of input data streams; locking, by third circuitry, to AMs in the first data streams; after locking to the AMs:

removing, by fourth circuitry, the AMs, and reinserting, by the fourth circuitry, the AMs so that after being processed by forward error correction (FEC) encoding circuitry, the AMs are located at an FEC codeword boundary and bits of a first AM, among the set of AMs, are spread across multiple outputs streams of the FEC encoding circuitry; encoding, by the FEC encoding circuitry, data output by the fourth circuitry according to an FEC to generate FEC codewords; distributing, by the FEC encoding circuitry, data from the FEC codewords to the multiple outputs streams of the FEC encoding circuitry; and generating, by fifth circuitry, the single output data stream based on the multiple output streams of the FEC encoding circuitry.

Embodiment 9: The method for converting the plurality of input data streams into the single output data stream of embodiment 8, further comprising: removing, by the second circuitry, idle data corresponding to interpacket gaps (IPGs) in the input data streams to make room for the sets of AMs in the first data streams.

Embodiment 10: The method for converting the plurality of input data streams into the single output data stream of embodiment 8, further comprising: periodically inserting, by the second circuitry, dummy bit blocks between bit blocks from the input streams; wherein periodically inserting the set of AMs comprises periodically replacing a respective set of dummy bit blocks with a respective set of AMs.

Embodiment 11: The method for converting the plurality of input data streams into the single output data stream of embodiment 10, further comprising: writing data from the input streams to respective FIFO buffers at a first rate; reading data from the FIFO buffers at a second rate higher than the first rate to generate respective second data streams; periodically pausing reading data from the FIFO buffers; and distributing data from the second data streams to the first data streams; wherein periodically inserting the dummy bit blocks comprises periodically inserting the dummy bit blocks in connection with periodically pausing the reading of data from the FIFO buffers.

Embodiment 12: The method for converting the plurality of input data streams into the single output data stream of either of embodiments 10 or 11, further comprising: receiving eight input data streams each at a data rate of 10.3125 gigabits per second (Gbps); wherein distributing the bit blocks comprises distributing the bit blocks from the eight input data streams to four first data streams; and wherein generating the single output data stream comprises generating the single output data stream to have a data rate of 103.125 Gbps.

Embodiment 13: The method for converting the plurality of input data streams into the single output data stream of either of embodiments 8 or 9, further comprising: receiving eight input data streams each at a data rate of 10.3125 gigabits per second (Gbps); wherein distributing the bit blocks comprises distributing the bit blocks from the eight input data streams to four first data streams; and wherein generating the single output data stream comprises generating the single output data stream to have a data rate of 82.5 Gbps.

Embodiment 14: The method for converting the plurality of input data streams into the single output data stream of any of embodiments 8-13, further comprising: generating, by a serializer/deserializer (SERDES) coupled to the fifth circuitry, a serial data stream based on the single output data stream.

Embodiment 15: An interface device for converting a plurality of input data streams into a single output data stream, the interface device comprising: first circuitry configured to: write data from a plurality of input streams to respective FIFO buffers at a first rate, read data from the FIFO buffers at a second rate higher than the first rate to generate respective first data streams, periodically insert dummy bit blocks and alignment markers (AMs) into the first data streams, and distribute data from the first data streams to a plurality of second data streams, wherein a number second data streams is less than a number of first data streams; second circuitry configured to lock to the AMs in the second data streams and provide data in the second streams to forward error correction (FEC) encoder circuitry; the FEC encoder circuitry, the FEC encoding circuitry configured to encode data from the second circuitry according to an FEC code to generate FEC codewords; and third circuitry configured to generate the single output data stream based on the FEC codewords generated by the FEC encoding circuitry.

Embodiment 16: The interface device of embodiment 15, wherein the first circuitry is further configured to: periodically pause reading data from the FIFO buffers, and periodically insert the dummy bit blocks into the first data streams in connection with periodically pausing the reading of data from the FIFO buffers.

Embodiment 17: The interface device of either of embodiments 15 or 16, wherein the first circuitry is further configured to: periodically insert AMs by replacing a set of dummy bit blocks with the AMs.

Embodiment 18: The interface device of any of embodiments 15-18, wherein the first circuitry is configured to: write data from the plurality of input streams to the respective FIFO buffers at a data rate of 10.3125 gigabits per second (Gbps); and read data from the FIFO buffers at a data rate of 12.375 Gbps.

Embodiment 19: The interface device of any of embodiments 15-18, further comprising: a serializer/deserializer (SERDES) coupled to the third circuitry, the SERDES configured to generate a serial data stream based on the single output data stream.

Embodiment 20: A method for converting a plurality of input data streams into a single output data stream, the method comprising: writing data from a plurality of input streams to respective first-in-first-out (FIFO) buffers at a first rate; reading data from the FIFO buffers at a second rate higher than the first rate to generate respective first data streams; periodically inserting, by first circuitry, dummy bit blocks and alignment markers (AMs) into the first data streams; distributing, by the first circuitry, data from the first data streams to a plurality of second data streams, wherein a number second data streams is less than a number of first data streams; locking, by second circuitry, to the AMs in the second data streams; providing, by the second circuitry, data in the second streams to forward error correction (FEC) encoder circuitry; encoding, by the FEC encoder circuitry, data from the second circuitry according to an FEC code to generate FEC codewords; and generating, by third circuitry, the single output data stream based on the FEC codewords generated by the FEC encoding circuitry.

Embodiment 21: The method of embodiment 20, further comprising: periodically pausing reading data from the FIFO buffers; and periodically inserting, by the first circuitry, the dummy bit blocks into the first data streams in connection with periodically pausing the reading of data from the FIFO buffers.

Embodiment 22: The method of either of embodiments 20 or 21, wherein periodically inserting AMs comprises: periodically replacing a set of dummy bit blocks with the AMs.

Embodiment 23: The method of any of embodiments 20-22, wherein: writing data from the plurality of input streams to the respective FIFO buffers comprises writing data from the plurality of input streams to the respective FIFO buffers at a data rate of 10.3125 gigabits per second (Gbps); and reading data from the FIFO buffers comprises reading data from the FIFO buffers at a data rate of 12.375 Gbps.

Embodiment 24: The method of any of embodiments 20-23, further comprising: generating, by a serializer/deserializer (SERDES), the serial data stream based on the single output data stream.

At least some of the various blocks, operations, and techniques described above may be implemented utilizing hardware, a processor executing firmware instructions, a processor executing software instructions, or any combination thereof.

When implemented using hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. An interface device for converting a plurality of input data streams into a single output data stream, the interface device comprising:

first circuitry configured to receive a plurality of input data streams and to distribute bit blocks from the plurality of input data streams to a number of first data streams that is less than a number of input data streams in the plurality of input data streams;

second circuitry configured to periodically insert a set of alignment markers (AMs) into the first data streams in between bit blocks, the set of AMs comprising at most the number of input data streams;

third circuitry configured to lock to the AMs in the first data streams;

fourth circuitry configured to, after locking to the AMs and prior to providing data corresponding to the first data streams to forward error correction (FEC) encoding circuitry, remove the AMs, and reinsert the AMs so that after being processed by the FEC encoding circuitry, the AMs are located at an FEC codeword boundary and bits of a first AM, among the set of AMs, are spread across multiple outputs streams of the FEC encoding circuitry;

the FEC encoding circuitry, the FEC encoding circuitry configured to i) encode data output by the fourth circuitry according to an FEC code to generate FEC codewords, and ii) distribute data from the FEC codewords to the multiple outputs streams of the FEC encoding circuitry; and fifth circuitry configured to generate the single output data stream based on the multiple output streams of the FEC encoding circuitry.

2. The interface device of claim 1, wherein the second circuitry is further configured to:

remove idle data corresponding to interpacket gaps (IPGs) in the input data streams to make room for the sets of AMs in the first data streams.

3. The interface device of claim 1, wherein the second circuitry is further configured to:

periodically insert dummy bit blocks between bit blocks from the input streams; and periodically replace a respective set of dummy bit blocks with a respective set of AMs.

4. The interface device of claim 3, wherein:

the second circuitry comprises a plurality of first-in-first-out (FIFO) buffers that correspond to respective input streams;

the second circuitry is further configured to:

write data from the input streams to respective FIFO buffers at a first rate, read data from the FIFO buffers at a second rate higher than the first rate to generate respective second data streams, periodically pause reading data from the FIFO buffers, periodically insert the dummy bit blocks into the second data streams in connection with periodically pausing the reading of data from the FIFO buffers, and distribute data read from the second data streams to the first data streams.

5. The interface device of claim 1, wherein:

the first circuitry configured to receive eight input data streams each at a data rate of 10.3125 gigabits per second (Gbps) and to distribute bit blocks from the eight input data streams to four first data streams; and the fifth circuitry configured to generate the single output data stream to have a data rate of 103.125 Gbps.

6. The interface device of claim 1, wherein:

the first circuitry is configured to receive eight input data streams each at a data rate of up to 10.3125 gigabits per second (Gbps) and to distribute bit blocks from the eight input data streams to four first data streams; and the fifth circuitry is configured to generate the single output data stream to have a data rate of 82.5 Gbps.

7. The interface device of claim 1, further comprising:

a serializer/deserializer (SERDES) coupled to the fifth circuitry, the SERDES configured to generate a serial data stream based on the single output data stream.

8. A method for converting a plurality of input data streams into a single output data stream, the method comprising:

distributing, by first circuitry of an interface device, bit blocks from a plurality of input data streams to a number of first data streams that is less than a number of input data streams in the plurality of input data streams;

periodically inserting, by second circuitry, a set of alignment markers (AMs) into the first data streams in between bit blocks, the set of AMs comprising at most the number of input data streams;

locking, by third circuitry, to AMs in the first data streams;

after locking to the AMs and prior to providing data corresponding to the first data streams to forward error correction (FEC) encoding circuitry, removing, by fourth circuitry, the AMs, and reinserting, by the fourth circuitry, the AMs so that after being processed by the EEC encoding circuitry, the AMs are located at an FEC codeword boundary and bits of a first AM, among the set of AMs, are spread across multiple outputs streams of the FEC encoding circuitry;

encoding, by the FEC encoding circuitry, data output by the fourth circuitry according to an FEC to generate FEC codewords;

distributing, by the FEC encoding circuitry, data from the FEC codewords to the multiple outputs streams of the FEC encoding circuitry; and generating, by fifth circuitry, the single output data stream based on the multiple output streams of the FEC encoding circuitry.

9. The method for converting the plurality of input data streams into the single output data stream of claim 8, further comprising:

removing, by the second circuitry, idle data corresponding to interpacket gaps (IPGs) in the input data streams to make room for the sets of AMs in the first data streams.

10. The method for converting the plurality of input data streams into the single output data stream of claim 8, further comprising:

periodically inserting, by the second circuitry, dummy bit blocks between bit blocks from the input streams;

wherein periodically inserting the set of AMs comprises periodically replacing a respective set of dummy bit blocks with a respective set of AMs.

11. The method for converting the plurality of input data streams into the single output data stream of claim 10, further comprising:

writing data from the input streams to respective FIFO buffers at a first rate;

reading data from the FIFO buffers at a second rate higher than the first rate to generate respective second data streams;

periodically pausing reading data from the FIFO buffers; and distributing data from the second data streams to the first data streams;

wherein periodically inserting the dummy bit blocks comprises periodically inserting the dummy bit blocks in connection with periodically pausing the reading of data from the FIFO buffers.

12. The method for converting the plurality of input data streams into the single output data stream of claim 8, further comprising:

receiving eight input data streams each at a data rate of 10.3125 gigabits per second (Gbps);

wherein distributing the bit blocks comprises distributing the bit blocks from the eight input data streams to four first data streams; and wherein generating the single output data stream comprises generating the single output data stream to have a data rate of 103.125 Gbps.

13. The method for converting the plurality of input data streams into the single output data stream of claim 8, further comprising:

receiving eight input data streams each at a data rate of 10.3125 gigabits per second (Gbps);

wherein distributing the bit blocks comprises distributing the bit blocks from the eight input data streams to four first data streams; and wherein generating the single output data stream comprises generating the single output data stream to have a data rate of 82.5 Gbps.

14. The method for converting the plurality of input data streams into the single output data stream of claim 8, further comprising:

generating, by a serializer/deserializer (SERDES) coupled to the fifth circuitry, a serial data stream based on the single output data stream.

15. An interface device for converting a plurality of input data streams into a single output data stream, the interface device comprising:

first circuitry configured to:

write data from a plurality of input streams to respective FIFO buffers at a first rate, read data from the FIFO buffers at a second rate higher than the first rate to generate respective first data streams, periodically pause reading data from the FIFO buffers, periodically insert dummy bit blocks and alignment markers (AMs) into the first data streams, including periodically inserting the dummy bit blocks in connection with periodically pausing the reading of data from the FIFO buffers, and distribute data from the first data streams to a plurality of second data streams, wherein a number second data streams is less than a number of first data streams;

second circuitry configured to lock to the AMs in the second data streams and provide data in the second streams to forward error correction (FEC) encoder circuitry;

the FEC encoder circuitry, the FEC encoding circuitry configured to encode data from the second circuitry according to an FEC code to generate FEC codewords; and third circuitry configured to generate the single output data stream based on the FEC codewords generated by the FEC encoding circuitry.

16. The interface device of claim 15, wherein the first circuitry is further configured to:

periodically insert AMs by replacing a set of dummy bit blocks with the AMs.

17. The interface device of claim 15, wherein the first circuitry is configured to:

write data from the plurality of input streams to the respective FIFO buffers at a data rate of 10.3125 gigabits per second (Gbps); and read data from the FIFO buffers at a data rate of 12.375 Gbps.

18. The interface device of claim 15, further comprising:

a serializer/deserializer (SERDES) coupled to the third circuitry, the SERDES configured to generate a serial data stream based on the single output data stream.

19. A method for converting a plurality of input data streams into a single output data stream, the method comprising:

writing data from a plurality of input streams to respective first-in-first-out (FIFO) buffers at a first rate;

reading data from the FIFO buffers at a second rate higher than the first rate to generate respective first data streams;

periodically pausing reading data from the FIFO buffers;

periodically inserting, by first circuitry, dummy bit blocks and alignment markers (AMs) into the first data streams, including periodically inserting the dummy bit blocks into the first data streams in connection with periodically pausing the reading of data from the FIFO buffers;

distributing, by the first circuitry, data from the first data streams to a plurality of second data streams, wherein a number second data streams is less than a number of first data streams;

locking, by second circuitry, to the AMs in the second data streams;

providing, by the second circuitry, data in the second streams to forward error correction (FEC) encoder circuitry;

encoding, by the FEC encoder circuitry, data from the second circuitry according to an FEC code to generate FEC codewords; and generating, by third circuitry, the single output data stream based on the FEC codewords generated by the FEC encoding circuitry.

20. The method of claim 19, wherein periodically inserting AMs comprises:

periodically replacing a set of dummy bit blocks with the AMs.

21. The method of claim 19, wherein:

writing data from the plurality of input streams to the respective FIFO buffers comprises writing data from the plurality of input streams to the respective FIFO buffers at a data rate of 10.3125 gigabits per second (Gbps); and reading data from the FIFO buffers comprises reading data from the FIFO buffers at a data rate of 12.375 Gbps.

22. The method of claim 19, further comprising:

generating, by a serializer/deserializer (SERDES), the serial data stream based on the single output data stream.

23. An interface device for converting a plurality of input data streams into a single output data stream, the interface device comprising:

first circuitry configured to:

write data from a plurality of input streams to respective FIFO buffers at a data rate of 10.3125 gigabits per second (Gbps), read data from the FIFO buffers at a data rate of 12.375 Gbps to generate respective first data streams, periodically insert dummy bit blocks and alignment markers (AMs) into the first data streams, and distribute data from the first data streams to a plurality of second data streams, wherein a number second data streams is less than a number of first data streams;

second circuitry configured to lock to the AMs in the second data streams and provide data in the second streams to forward error correction (FEC) encoder circuitry;

the FEC encoder circuitry, the FEC encoding circuitry configured to encode data from the second circuitry according to an FEC code to generate FEC codewords; and third circuitry configured to generate the single output data stream based on the FEC codewords generated by the FEC encoding circuitry.

24. A method for converting a plurality of input data streams into a single output data stream, the method comprising:

writing data from a plurality of input streams to respective first-in-first-out (FIFO) buffers at a data rate of 10.3125 gigabits per second (Gbps);

reading data from the FIFO buffers at a data rate of 12.375 Gbps to generate respective first data streams;

periodically inserting, by first circuitry, dummy bit blocks and alignment markers (AMs) into the first data streams;

distributing, by the first circuitry, data from the first data streams to a plurality of second data streams, wherein a number second data streams is less than a number of first data streams;

locking, by second circuitry, to the AMs in the second data streams;

providing, by the second circuitry, data in the second streams to forward error correction (FEC) encoder circuitry;

encoding, by the FEC encoder circuitry, data from the second circuitry according to an FEC code to generate FEC codewords; and generating, by third circuitry, the single output data stream based on the FEC codewords generated by the FEC encoding circuitry.

* * * * *